United States Patent
Aoki et al.

(10) Patent No.: US 12,075,164 B2
(45) Date of Patent: Aug. 27, 2024

(54) IMAGING DEVICE PERFORMING ENLARGMENT PROCESSING BASED ON SPECIFIED AREA OF OBJECT IMAGE, STORAGE MEDIUM, AND METHOD OF DISPLAYING OBJECT IMAGE

(71) Applicant: CASIO COMPUTER CO., LTD., Tokyo (JP)

(72) Inventors: Nobuhiro Aoki, Kokubunji (JP); Yuya Hayashi, Shirai (JP); Yuki Katada, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/376,126

(22) Filed: Oct. 3, 2023

(65) Prior Publication Data
US 2024/0031679 A1    Jan. 25, 2024

Related U.S. Application Data

(63) Continuation of application No. 17/838,126, filed on Jun. 10, 2022, now Pat. No. 11,812,150.

(30) Foreign Application Priority Data

Jun. 23, 2021 (JP) .................. 2021-104268

(51) Int. Cl.
H04N 23/69 (2023.01)
H04N 23/61 (2023.01)
H04N 23/63 (2023.01)

(52) U.S. Cl.
CPC ............. *H04N 23/69* (2023.01); *H04N 23/61* (2023.01); *H04N 23/635* (2023.01)

(58) Field of Classification Search
CPC ....... H04N 23/69; H04N 23/61; H04N 23/635
(Continued)

(56) References Cited

U.S. PATENT DOCUMENTS 7,701,491 B2    4/2010    Abe et al.
8,599,244 B2   12/2013    Hirooka et al.
(Continued)

FOREIGN PATENT DOCUMENTS

JP    2001159730 A    6/2001
JP    2006211489 A    8/2006
(Continued)

OTHER PUBLICATIONS

Japanese Office Action (and English language translation thereof) dated Apr. 11, 2023, issued in counterpart Japanese Application No. 2021-104268.
(Continued)

*Primary Examiner* — Usman A Khan
(74) *Attorney, Agent, or Firm* — Holtz, Holtz & Volek PC

(57) ABSTRACT

A device includes a processor which controls a display operation of a display unit. The processor acquires a specified portion specified by a first user operation in an object image including an object to be imaged, sets an enlargement reference point in the object image according to the specified portion with respect to which a part of the object image is enlarged when performing enlargement display control, and extracts a display target range from the object image as the part of the object image to be enlarged. The display target range includes both the enlargement reference point and the specified portion, and the enlargement reference point is set so that the representative point approaches a middle of the display area in response to each input of a second user
(Continued)

operation for performing enlargement display control, until the representative point coincides with the middle of the display area.

7 Claims, 22 Drawing Sheets

(58) Field of Classification Search
USPC .................................................. 348/240.2
See application file for complete search history.

(56) References Cited

U.S. PATENT DOCUMENTS

| | | |
|---|---|---|
| 9,503,648 B2 | 11/2016 | Hirooka et al. |
| 10,432,876 B2 | 10/2019 | Hirooka et al. |
| 10,582,134 B2 | 3/2020 | Hirooka et al. |
| 2009/0153649 A1 | 6/2009 | Hirooka et al. |
| 2009/0267907 A1 | 10/2009 | Noma |
| 2010/0053365 A1 | 3/2010 | Abe et al. |
| 2011/0115967 A1* | 5/2011 | Lee .................... H04N 23/676 |
| | | 348/E5.045 |
| 2011/0267503 A1 | 11/2011 | Kunishige et al. |
| 2012/0201422 A1 | 8/2012 | Tsukamoto |
| 2012/0274780 A1 | 11/2012 | Yamamoto |
| 2014/0059457 A1* | 2/2014 | Min .................... G06F 3/0484 |
| | | 715/764 |
| 2014/0092290 A1 | 4/2014 | Hirooka et al. |
| 2014/0226039 A1 | 8/2014 | Yamamoto et al. |
| 2020/0162681 A1 | 5/2020 | Hirooka et al. |

FOREIGN PATENT DOCUMENTS

| | | |
|---|---|---|
| JP | 2008182374 A | 8/2008 |
| JP | 2009147572 A | 7/2009 |
| JP | 2011234234 A | 11/2011 |

OTHER PUBLICATIONS

Japanese Office Action (and English language translation thereof) dated Oct. 18, 2022, issued in counterpart Japanese Application No. 2021-104268.

Notice of Allowance dated Jun. 30, 2023, issued in parent U.S. Appl. No. 17/838,126.

Office Action (Non-Final Rejection) dated Mar. 7, 2023, issued in parent U.S. Appl. No. 17/838,126.

* cited by examiner

A OBJECT IMAGE AT EQUAL MAGNIFICATION

FIRST ENLARGEMENT DISPLAY CONTROL

B FIRST ENLARGED IMAGE

SECOND ENLARGEMENT DISPLAY CONTROL

C SECOND ENLARGED IMAGE

THIRD ENLARGEMENT DISPLAY CONTROL

D THIRD ENLARGED IMAGE

A OBJECT IMAGE AT EQUAL MAGNIFICATION

FIRST ENLARGEMENT DISPLAY CONTROL

B FIRST ENLARGED IMAGE

SECOND ENLARGEMENT DISPLAY CONTROL

C SECOND ENLARGED IMAGE

THIRD ENLARGEMENT DISPLAY CONTROL

D THIRD ENLARGED IMAGE

A THIRD ENLARGED IMAGE

FIRST REDUCTION DISPLAY CONTROL

B SECOND ENLARGED IMAGE

SECOND REDUCTION DISPLAY CONTROL

C FIRST ENLARGED IMAGE

THIRD REDUCTION DISPLAY CONTROL

D OBJECT IMAGE AT EQUAL MAGNIFICATION

A OBJECT IMAGE AT EQUAL MAGNIFICATION

B FIRST ENLARGED IMAGE

C SECOND ENLARGED IMAGE

D THIRD ENLARGED IMAGE

IMAGING DEVICE PERFORMING ENLARGMENT PROCESSING BASED ON SPECIFIED AREA OF OBJECT IMAGE, STORAGE MEDIUM, AND METHOD OF DISPLAYING OBJECT IMAGE

REFERENCE TO RELATED APPLICATION

The present application is a Continuation of U.S. application Ser. No. 17/838,126, filed on Jun. 10, 2022, which claims the benefit of foreign priority to Japanese Patent Application No. 2021-104268, filed on Jun. 23, 2021, the entire contents of both of which are incorporated herein by reference.

BACKGROUND

1. Technical Field

The present disclosure relates to an imaging device, a storage medium, and a method of displaying an object image.

2. Related Art

Conventionally, in an imaging device such as a camera, there is known a technique of enabling imaging while visually recognizing an object on a display unit such as a liquid crystal display by displaying an object image including the object on the display unit. Furthermore, Japanese Patent Application Laid-Open No. 2001-159730 discloses a technique of enlarging and displaying a desired range of a displayed object image on a display unit in accordance with a user operation of selecting the range, and imaging the object in a composition of the enlarged image displayed on the display unit in accordance with an imaging operation performed in this state.

SUMMARY

An imaging device according to the present disclosure includes
   at least one processor configured to control a display operation of a display unit, in which
   the at least one processor
   acquires a specified portion specified by a first user operation in an object image including an object to be imaged,
   performs enlargement display control of enlarging a part of the object image and displaying the enlarged part in a display area of the display unit in response to a second user operation, and
   sets an enlargement reference portion in the object image according to the specified portion in the enlargement display control.

Further, an imaging device according to the present disclosure includes
   at least one processor configured to control a display operation of a display unit, in which
   the at least one processor
   acquires a specified portion specified by a first user operation in an object image including an object to be imaged,
   acquires an enlargement ratio of the object image in response to a second user operation,
   performs enlargement display control of extracting a display target range having a size according to the acquired enlargement ratio from the object image and displaying the display target range in a display area of the display unit, the display target range including the acquired specified portion, and
   performs one of a plurality of the enlargement display controls in which the display target ranges extracted from the object image are different from each other according to a position of the acquired specified portion and the acquired enlargement ratio.

Further, a method of displaying an object image according to the present disclosure is
   a method of displaying an object image including an object to be imaged, the method being executed by at least one processor of a device and comprising:
   acquiring a specified portion specified by a first user operation in the object image;
   enlarging a part of the object image and displaying the enlarged part of the object image in a display area of a display unit in response to a second user operation; and
   setting an enlargement reference portion in the object image according to the specified portion.

Further, a method of displaying an object image according to the present disclosure is
   a method of displaying an object image including an object to be imaged, the method being executed by at least one processor of a device and comprising:
   acquiring a specified portion specified by a first user operation in the object image;
   acquiring an enlargement ratio of the object image in response to a second user operation;
   performing enlargement display control of extracting a display target range having a size according to the acquired enlargement ratio from the object image and displaying the display target range in a display area of a display unit, the display target range including the acquired specified portion; and
   performing one of a plurality of the enlargement display controls in which the display target ranges extracted from the object image are different from each other according to a position of the acquired specified portion and the acquired enlargement ratio.

DETAILED DESCRIPTION

Hereinafter, embodiments of the present disclosure will be described with reference to the drawings.

<Configuration of Imaging Device>

Figure 1:
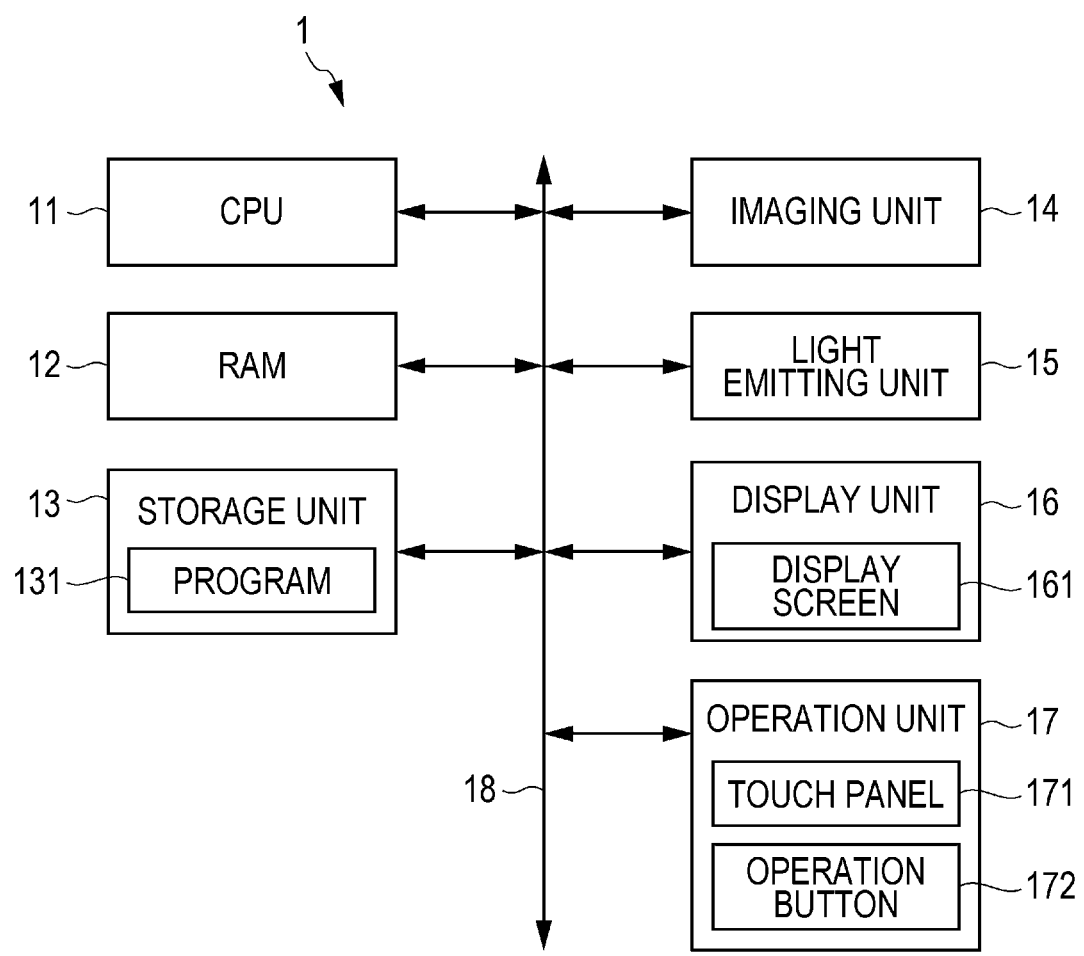
FIG. 1 is a block diagram illustrating a main functional configuration of an imaging device.

FIG. 1 is a block diagram illustrating a main functional configuration of an imaging device 1 of the present embodiment.

The imaging device 1 includes a central processing unit (CPU) 11, a random access memory (RAM) 12, a storage unit 13, an imaging unit 14, a light emitting unit 15, a display unit 16, an operation unit 17, and the like, and these units are connected by a bus 18. The imaging device 1 of the present embodiment is, for example, a digital camera that is operated by a user's hand.

The CPU 11 reads and executes a program 131 stored in the storage unit 13 and performs various types of arithmetic processing to control the operation of each unit of the imaging device 1. In the present embodiment, the CPU 11 corresponds to "at least one processor". Note that the at least one processor may include two or more circuit elements of the CPU or the like that performs the arithmetic processing. The CPU 11 controls a display operation of a through-the-lens image or the like by the display unit 16. Furthermore, at the time of imaging (capturing) the object, the CPU 11 causes the light emitting unit 15 to emit light in accordance with setting or a user operation, and causes the imaging unit 14 to perform imaging in accordance with a user operation to instruct imaging and generate image data of the object image.

The RAM 12 provides the CPU 11 with a working memory space and stores temporary data.

The storage unit 13 is a non-transitory recording medium readable by the CPU 11 as a computer, and includes a nonvolatile storage device such as a flash memory. The storage unit 13 stores the program 131 executed by the CPU 11, various data, and the like. The program 131 is stored in the storage unit 13 in the form of a computer-readable program code. Examples of the data stored in the storage unit 13 include image data of an image captured by the imaging unit 14, setting data related to operation setting of the imaging device 1, and the like.

The imaging unit 14 includes an optical system that forms an image of incident light, an imaging element that detects the incident light formed by the optical system, an image processing unit that generates image data on the basis of a detection signal output from the imaging element, and the like. The optical system can include, for example, a mirror, a lens group, and the like. The imaging element is not particularly limited as long as the imaging element can photoelectrically convert the incident light, and for example, a charge coupled device (CCD), a complementary metal oxide semiconductor (CMOS), or the like can be used. The image processing unit amplifies the detection signal from the imaging element and performs A/D conversion to generate the image data of the object image including the object. Furthermore, the image processing unit may perform various types of image processing such as shading correction and color correction for the generated image data.

The light emitting unit 15 emits light for illuminating the object toward an imaging direction by the imaging unit 14. ON/OFF of the light emission by the light emitting unit 15 is controlled by a control signal transmitted from the CPU 11.

The display unit 16 includes a display device such as a liquid crystal display. The display unit 16 displays the object image as a through-the-lens image (preview image) on a display screen 161 of the display device in real time, reproduces and displays the captured image, and displays various operation icons in accordance with the image data and the control signal transmitted from the CPU 11.

The operation unit 17 includes a touch panel 171 provided to overlap with the display screen 161, an operation button 172 provided on a housing of the imaging device 1, and the like. The operation unit 17 detects a contact of a finger or the like on the touch panel 171 or an operation on the operation button 172, and outputs an operation signal corresponding to a detection result to the CPU 11.

<Operation of Imaging Device>

Next, an operation of the imaging device 1 will be described.

Figure 2A:
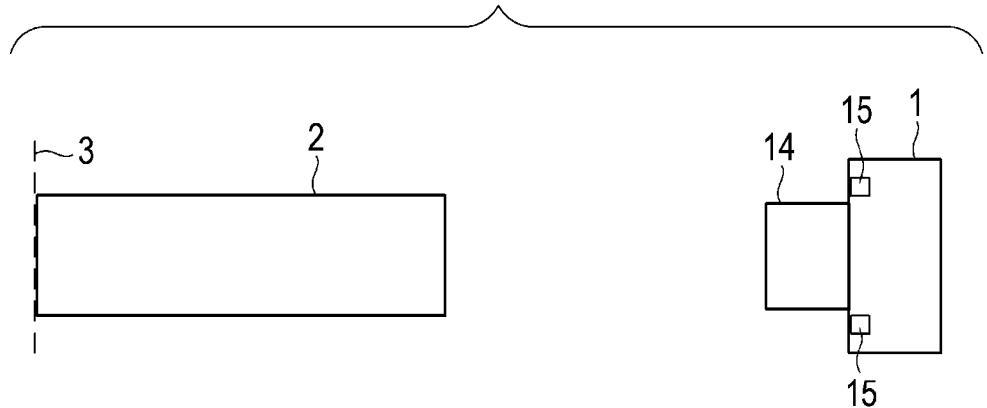
FIGS. 2A and 2B are diagrams for describing an example of an imaging method by the imaging device.
Figure 2B:
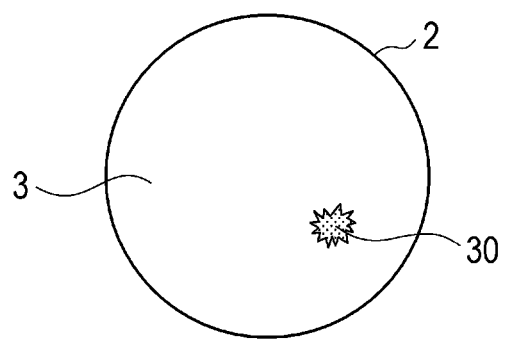

FIGS. 2A and 2B are diagrams for describing an example of an imaging method by the imaging device 1.

As illustrated in FIG. 2A, the imaging device 1 according to the present embodiment can image a surface of an object 3 through a cylindrical barrel 2 in contact with the object 3. As illustrated in FIG. 2B, the barrel 2 is arranged such that a desired portion (specified portion 30) of the object 3 is included in an opening of the barrel 2, the imaging device 1 is fixed to a stand (not illustrated) such that the barrel 2 and the object 3 are included in an angle of view of the imaging device 1, and imaging is performed in a state where the object 3 is illuminated by the light emitting unit 15. Thereby, it is possible to reliably image the specified portion 30 while suppressing a portion from an inlet to an outlet of the barrel 2 from being shielded by a shield. This method can be suitably used in, for example, a case of imaging an inner of a body such as a cervix, and in this case, the barrel 2 is a colposcope inserted into a vagina. The specified portion 30 may be, for example, an affected part (nasal cavity, ear cavity, or the like) to be examined, or may be a bottom of a hole of a structure. At the time of imaging, the inside of the barrel 2 is irradiated with light from the light emitting unit 15, and the surface including the specified portion 30 of the object 3 is illuminated. An adapter for fixing a positional relationship between the imaging device 1 and the barrel 2 may be used.

Figure 3:
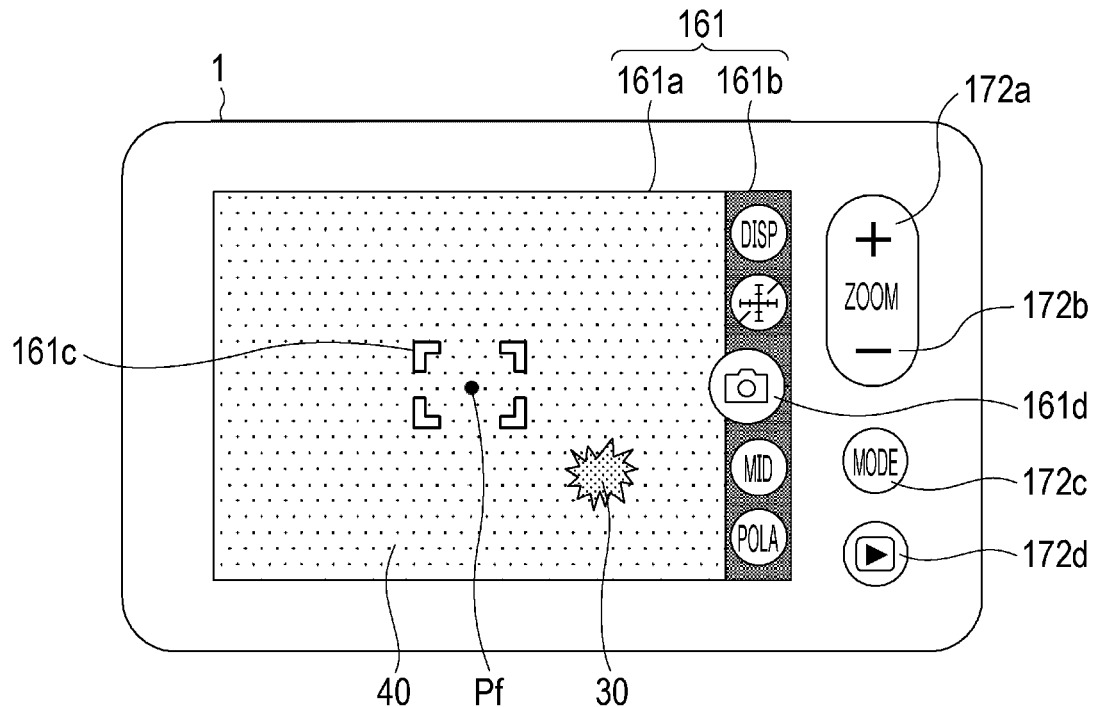
FIG. 3 is a view illustrating a back surface of the imaging device in a case where imaging is performed.

FIG. 3 is a view illustrating a back surface of the imaging device 1 in a case where imaging is performed.

The display screen 161 of the display unit 16 and a plurality of the operation buttons 172 are provided on the back surface (a surface opposite to a side facing the object 3 at the time of imaging) of the imaging device 1.

The display screen 161 includes a rectangular display area 161a in which a through-the-lens image of the object is displayed, and an operation icon area 161b in which operation icons are arranged. The through-the-lens image is obtained by displaying a moving image of the image data of the object image captured at a predetermined frame rate by the imaging unit 14 in real time. Therefore, a range of the object 3 corresponding to the angle of view of imaging by the imaging unit 14 is displayed in the through-the-lens image. In a case where imaging is instructed by a user, imaging is performed at the angle of view of the through-the-lens image. In the display area 161a, a focus mark 161c representing a position of a target to be focused of the object is displayed. Here, the focus mark 161c is a mark representing a rectangular area but is not limited thereto. A center position of the focus mark 161c in the display area 161a is hereinafter referred to as a focus position Pf.

In the operation icon area 161b, various operation icons including an imaging icon 161d are displayed. In a case where a contact operation is performed on the position of the operation icon, the CPU 11 executes processing associated in advance with the operation icon at the contact position. For example, in a case where the contact operation is performed on the position of the imaging icon 161d, the CPU 11 causes the imaging unit 14 to image the object with the composition of the through-the-lens image at that time. An imaging resolution at this time may be higher than the resolution of the image data transmitted to the display unit 16 for displaying the through-the-lens image. In addition to imaging of a still image, a moving image may be able to be imaged according to an operation mode.

Examples of the operation button 172 include an enlargement button 172a for enlarging and displaying (zooming in) the through-the-lens image, a reduction button 172b for reducing and displaying (zooming out) the through-the-lens image, a mode change button 172c for changing the operation mode of the imaging device 1, a reproduction button 172d for displaying the captured image in the display area 161a, and the like.

In a case where the enlargement button 172a is operated (for example, pressed), the through-the-lens image in the display area 161a is enlarged. Hereinafter, the through-the-lens image of the equal magnification before enlargement is referred to as an object image 40. The object image 40 to be enlarged by the enlargement button 172a may be an image that is stationary by being fixed such that a relative position between the imaging device 1 and the object 3 is constant. Alternatively, the object image 40 may be a still image in which the through-the-lens image is made still according to a predetermined user operation. The user operation on the enlargement button 172a corresponds to a "second user operation".

In the present embodiment, enlargement of the object image 40 is performed by digital zoom. That is, the enlargement of the object image 40 is performed by extracting a part of the image data of the object image 40 as an enlarged display target range and enlarging and displaying the extracted part in accordance with the display area 161a. This is because the object 3 is not included in the angle of view in a case where optical zoom is used in the method of illuminating the object 3 through the barrel and performing imaging in fixed state of the imaging device 1. Every time the enlargement button 172a is operated, an enlargement ratio (hereinafter, also referred to as a magnification or a display magnification) of the object image 40 increases to a predetermined value, and in a case where the enlargement ratio reaches the maximum magnification, the object image 40 is not enlarged even if the enlargement button 172a is operated thereafter. For example, every time the enlargement button 172a is operated, the image is enlarged at the magnification increased by a certain increase value (for example, the increase value=0.1, that is, 1.1 times, 1.2 times, or the like), and the magnification is increased to the maximum magnification (in the present embodiment, 8 times).

In a case where the reduction button 172b is operated in a state where the object image 40 is enlarged at an arbitrary magnification, the magnification of the object image 40 is decreased and the display is reduced (the image is reduced at the magnification decreased by a certain decrease value (for example, the decrease value=0.1, that is, 7.9 times, 7.8 times, . . . , and 1 time)), contrary to the above-described enlargement operation. The user operation on the reduction button 172b corresponds to a "third user operation". Every time the reduction button 172b is operated, the magnification is decreased at the same magnification step as the above-described enlargement operation, and in a case where the magnification reaches equal magnification, the object image 40 is not reduced even if the reduction button 172b is operated thereafter.

In a case where the imaging icon 161d is operated in a state where the display magnification of the object image 40 is adjusted by the enlargement button 172a and the reduction button 172b, the object 3 is imaged at the magnification (angle of view) displayed in the display area 161a.

In a case where the enlargement button 172a is operated in the case where the focus position Pf is at the center point of the display area 161a, the object image 40 is enlarged with reference to the position of the center point. Therefore, as illustrated in FIG. 3, in a case where the specified portion 30 to be imaged in the object image 40 deviates from the center point (the center of the angle of view) of the display area 161a, the specified portion 30 is distant from the center point according to the increase in the display magnification, and is no longer displayed in the display area 161a at or after a certain display magnification.

Figure 4:
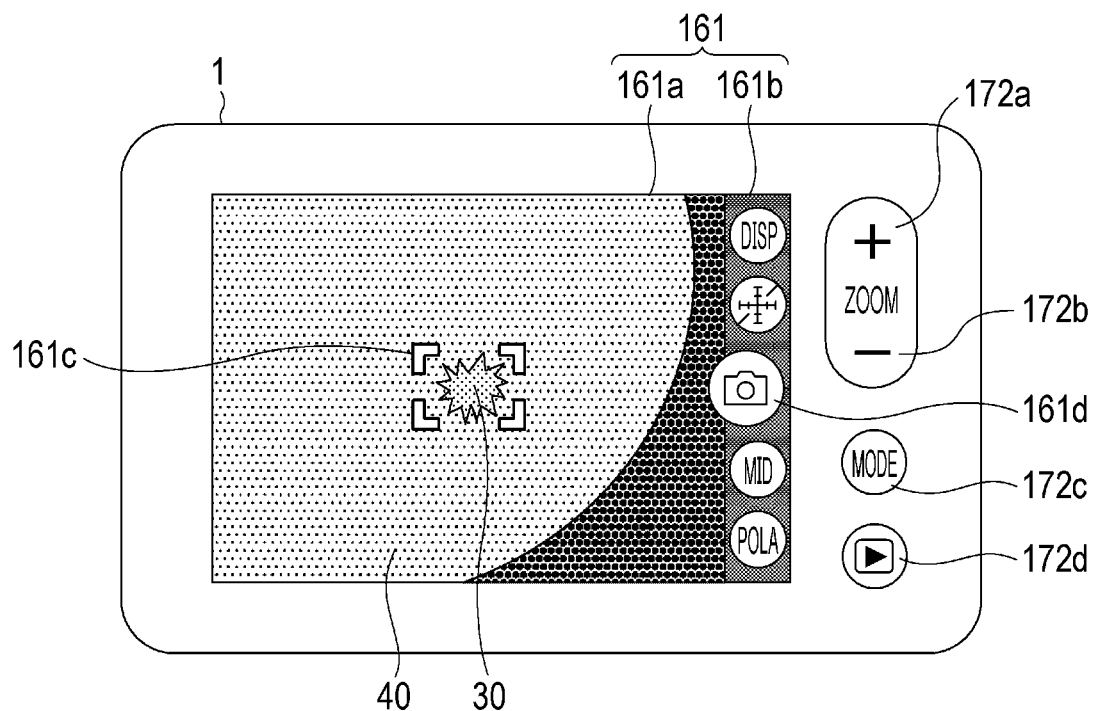
FIG. 4 is a view illustrating an imaging method of capturing a specified portion at a center of a display area.

In contrast, as illustrated in FIG. 4, in a case where the position of the imaging device 1 with respect to the barrel 2 is adjusted such that the specified portion 30 is located at the center point of the display area 161a, an outer area of the barrel 2 may be included in the angle of view. In this state, since a part of illumination light from the light emitting unit 15 is emitted to the outside of the barrel 2, there is a problem that the illumination for the object 3 inside the barrel 2 becomes insufficient.

Figure 5:
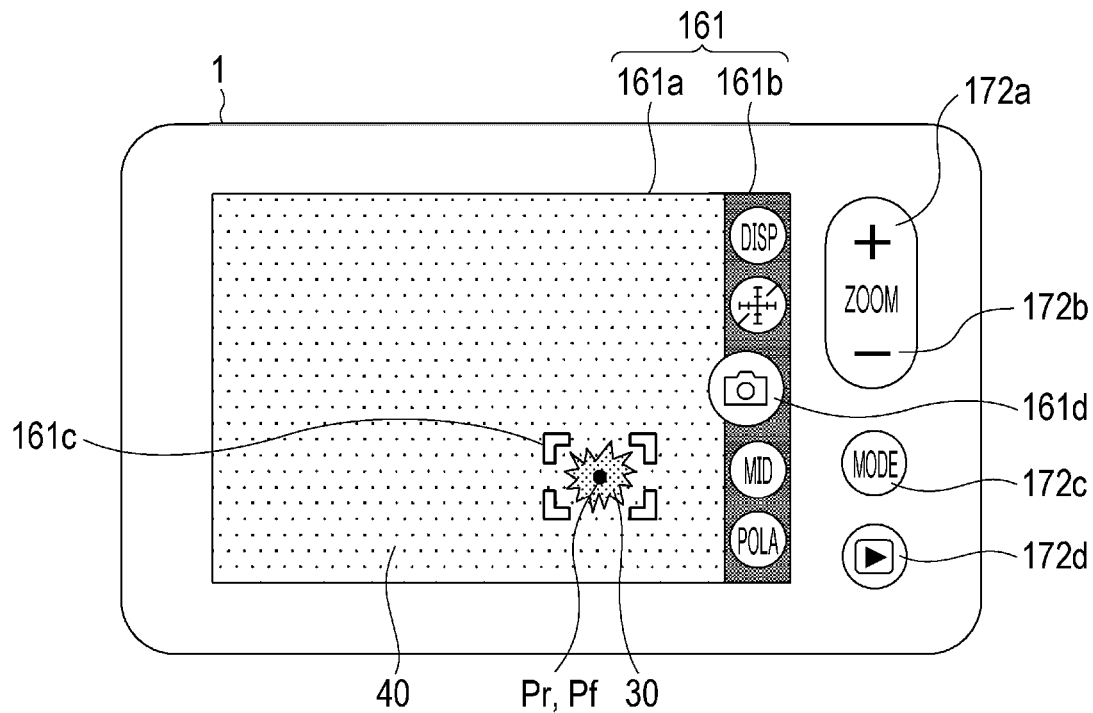
FIG. 5 is a view illustrating a state in which a focus position is matched with the specified portion.
Figure 6:
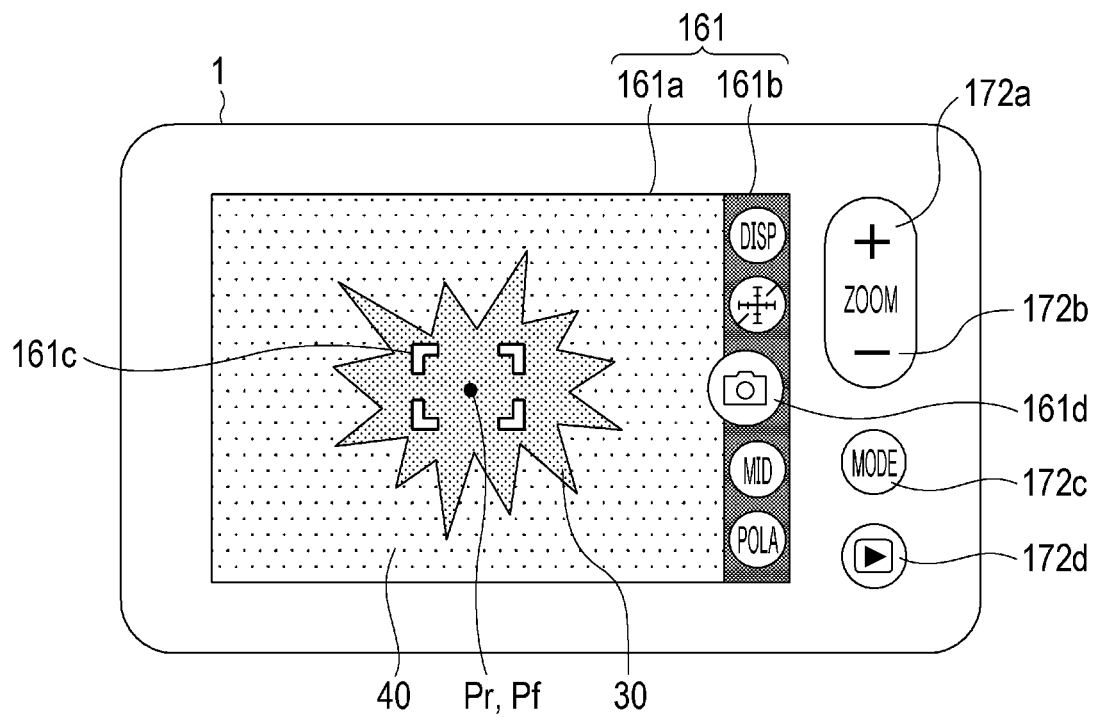
FIG. 6 is a view illustrating a state in which the specified portion is enlarged while being contained in a display area.

Therefore, in the imaging device 1 of the present embodiment, in the case where the specified portion 30 is at a position deviating from the center point of the display area 161a as illustrated in FIG. 3, it is possible to enlarge the object image 40 in a mode in which the specified portion 30 and an edge portion closest to the specified portion 30 among a plurality of edge portions at the initial angle of view before enlargement continue to fit inside the display area 161a. Specifically, as illustrated in FIG. 5, in a case where a predetermined user operation (first user operation) for specifying the specified portion 30 is performed, the focus position Pf is set at a position corresponding to the representative point Pr of the specified portion 30 in the object image 40, and the focus mark 161c moves such that the focus position Pf is at the center. The user operation of specifying the specified portion 30 may be, for example, an operation of tapping the specified portion 30 in the display area 161a with a finger. The position specified by this operation is the representative point Pr of the specified portion 30. As described above, the operation in which the CPU 11 acquires the specified portion 30 specified by the first user operation may include processing of specifying the representative point Pr of the specified portion 30. Furthermore, the operation may include processing of specifying a predetermined pixel range from the representative point Pr as the specified portion 30. In a case where the enlargement button 172a is operated in the state illustrated in FIG. 5, the object image 40 is enlarged such that the specified portion 30 and the closest edge portion fit inside the display area 161a, and the representative point Pr of the specified portion 30 approaches the center point of the display area 161a. After the representative point Pr reaches the center point, as illustrated in FIG. 6, the object image 40 is enlarged around the center point while the specified portion 30 remains inside the display area 161a. As described above, a display target range 40E is extracted from the object image 40 and displayed in the display area 161a such that the specified portion 30 is included in the enlarged display target range 40E. Note that the black dot indicating the representative point Pr and the focus position Pf in FIGS. 3, 5, and 6 is illustrated for convenience of description, and is not displayed in the actual display area 161a.

Hereinafter, the operation of enlarging and displaying the object image 40 in this manner will be described in detail.

<Enlargement Display Operation of Object Image>

Figure 7:
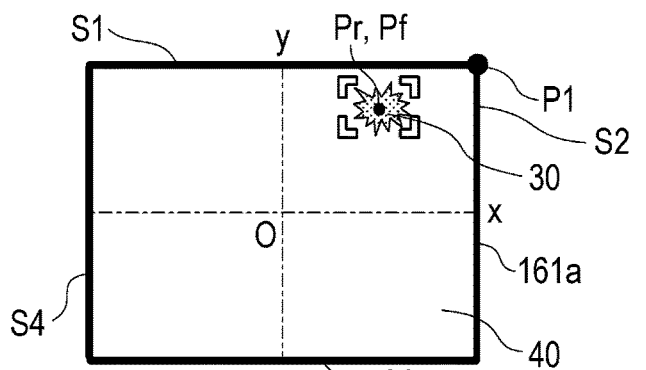
FIG. 7 is a diagram for describing an enlargement display operation of an object image.
Figure 7:
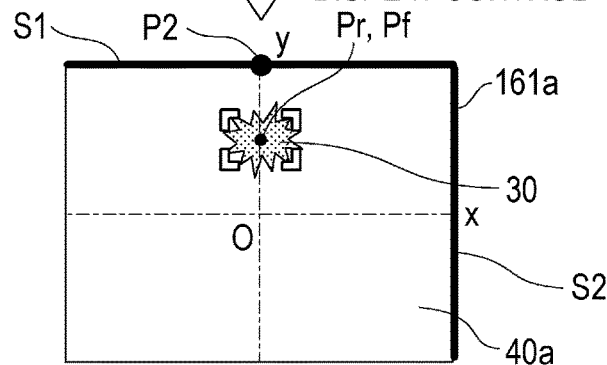
Figure 7:
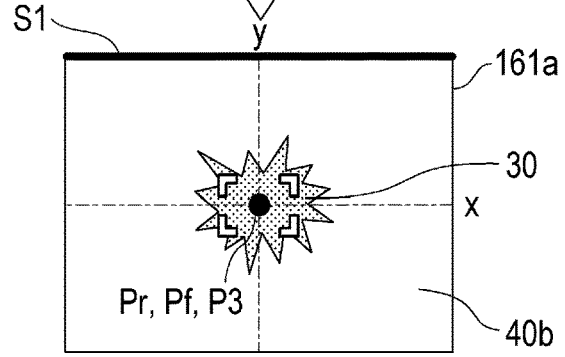
Figure 7:
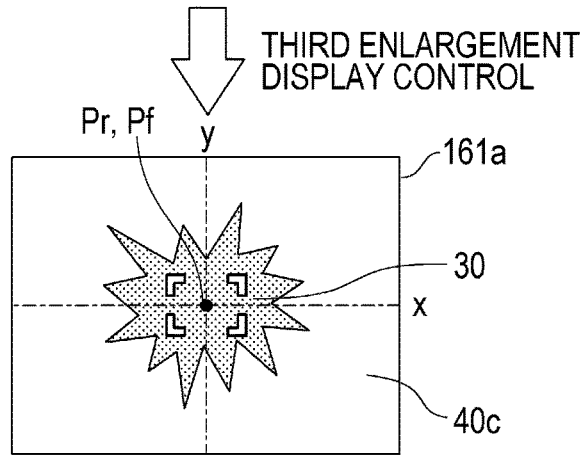

FIG. 7 is a diagram for describing an enlargement display operation of the object image 40.

A to D of FIG. 7 illustrate states in which the display target range extracted from the object image 40 is displayed in the display area 161a. Hereinafter, in the display target range displayed in the display area 161a, a position in the display target range is represented by an xy coordinate system having a point corresponding to the center point of the display area 161a as an origin O. An axis passing through the origin O and parallel to a long side of a rectangle formed by the display target range (therefore, a rectangle formed by the display area 161a) is defined as an x-axis (first axis), and an axis passing through the origin O and perpendicular to the x-axis is defined as a y-axis (second axis). An upward direction, a downward direction, a left direction, and a right direction in the following description refer to upward, downward, left, and right directions in FIG. 7 (similar in FIGS. 9, 16, and 17). In FIG. 7, the upward direction is the +y direction, the downward direction is the −y direction, the right direction is the +x direction, and the left direction is the −x direction. The enlargement display operation of the object image 40 differs depending on which quadrant the representative point Pr and the focus position Pf of the specified portion 30 are located in, where the display target range (display area 161a) is divided into the first to fourth quadrants. FIG. 7 illustrates a case in which the focus position Pf is in the first quadrant. Here, the first quadrant is a portion of x>0 and y>0, the second quadrant is a portion of x<0 and y>0, the third quadrant is a portion of x<0 and y<0, and the fourth quadrant is a portion of x>0 and y<0 in the xy coordinate system.

A of FIG. 7 illustrates a state in which the object image 40 at the equal magnification is displayed in the display area 161a. That is, A of FIG. 7 illustrates a state in which the entire object image 40 is extracted and displayed as the display target range. As described above, the display target range may be the entire object image 40. In A of FIG. 7, an upper side S1, a right side S2, a lower side S3, and a left side S4 of the object image 40 are located on an outer periphery of the display area 161a. In a case where the enlargement button 172a is operated once or a plurality of times in the state of A of FIG. 7, a first enlargement display control is performed every time the enlargement button is operated, and a first enlarged image illustrated in B of FIG. 7 is displayed in the display area 161a. In a case where the enlargement button 172a is operated once or a plurality of times in the state of B of FIG. 7, a second enlargement display control is performed every time the enlargement button is operated, and a second enlarged image illustrated in C of FIG. 7 is displayed in the display area 161a. In a case where the enlargement button 172a is operated once or a plurality of times in the state of C of FIG. 7, a third enlargement display control is performed every time the enlargement button is operated, and a third enlarged image illustrated in D of FIG. 7 is displayed in the display area 161a. The first enlarged image at an intermediate display magnification between A and B in FIG. 7 may be displayed according to the number of times of the operation of the enlargement button 172a or the like. Similarly, the second enlarged image at an intermediate display magnification between B and C of FIG. 7 may be displayed, and the third enlarged image at an intermediate display magnification between C and D of FIG. 7 may be displayed. Hereinafter, the first to third enlargement display controls will be described.

In the first enlargement display control, an enlargement reference point P1 (enlargement reference portion) is set at the corner closest to the representative point Pr of the specified portion 30 among the four corners of the object image 40 illustrated in A of FIG. 7. For example, in the case where the representative point Pr and the focus position Pf are located in the first quadrant of the display area 161a in the state where the object image 40 at the equal magnification is displayed in the display area 161a, the enlargement reference point P1 is set at the upper right corner where the upper side S1 and the right side S2 intersect in the edge portion of the object image 40. Then, the display target range 40a to be displayed after enlargement is extracted from the object image 40 such that the enlargement reference point P1 and the specified portion 30 fit within the enlarged display target range 40a of the object image 40, and the extracted display target range 40a is enlarged and displayed in the display area 161a (B of FIG. 7). From another point of view, the object image 40 is enlarged and displayed with reference to the enlargement reference point P1. Here, "to enlarge and display an image with reference to the enlargement reference point" means to enlarge an image in a mode in which the position of the enlargement reference point in the display area 161a is the same before and after the enlargement. By enlarging the image with reference to the enlargement reference point P1, the representative point Pr of the enlarged specified portion 30 approaches the center point of the display area 161a (the origin O of the enlarged display target range). In other words, in the first enlargement display control, the enlargement reference point P1 is set such that the distance between the representative point Pr of the specified portion 30 after enlargement and the center point (origin O) of the display area 161a becomes equal to or less than the distance between the representative point Pr before enlargement and the center point (origin O). As a result, the specified portion 30 can be prevented from deviating (cannot be partly cut off) from the display area 161a after enlargement. Furthermore, the focus position Pf is changed to the position where the representative point Pr in the enlarged display target range 40a is displayed in display area 161a.

In a case where the display magnification reaches a certain value by the first enlargement display control from the state in A of FIG. 7, the representative point Pr and the focus position Pf of the specified portion 30 in the enlarged display target range 40a overlap with the y-axis, as illustrated in B of FIG. 7. Note that, in a case where the representative point Pr and the focus position Pf are located in the area where x<0 (that is, in the area on the left side of the y-axis) at the end of the first enlargement display control, the enlarged display target range 40a is adjusted such that the representative point Pr and the focus position Pf overlap with the y-axis. Furthermore, in a case where the representative point Pr is located in the quadrant on the left side of the y-axis (the second quadrant or the third quadrant) in the object image 40 at the equal magnification, the representative point Pr approaches the y-axis from the left side of the y-axis by the first enlargement control. In this case, in a case where the representative point Pr and the focus position Pf are located in the area where x>0 (that is, in the area on the right side of the y-axis) at the end of the first enlargement display control, the enlarged display target range 40a is adjusted such that the representative point Pr and the focus position Pf overlap with the y-axis. In the case where the representative point Pr and the focus position Pf overlap with the y-axis in the first enlargement display control, the second enlargement display control is started.

In the second enlargement display control, an enlargement reference point P2 (enlargement reference portion) is set at an intersection of the y-axis where the representative point Pr and the focus position Pf overlap with each other and the edge portion of the object image 40. Specifically, in the state of B of FIG. 7, the upper side S1 of the edge portion of the object image 40 overlaps with the upper side of the outer periphery of the display area 161a, and the y-axis intersects with the upper side S1. Therefore, the enlargement reference point P2 is set at the intersection of the y-axis and the upper side S1 of the edge portion of the object image 40. The enlargement reference point P2 set as described above is located on the edge portion of the object image 40. Then, an enlarged display target range 40b is extracted from the object image 40 (from the display target range 40a) and displayed such that the enlargement reference point P2 and the specified portion 30 are contained. That is, the object image 40 is enlarged and displayed with reference to the enlargement reference point P2. By enlarging the image with reference to the enlargement reference point P2, the representative point Pr approaches the center point (origin O) of the display area 161a in the state where the position of the representative point Pr of the specified portion 30 in the x-axis direction is fixed. Therefore, also in the second enlargement display control, the enlargement reference point P2 is set such that the distance between the representative point Pr and the center point (origin O) after the enlargement becomes equal to or less than the distance between the representative point Pr and the center point (origin O) before the enlargement.

In a case where the display magnification of the object image 40 reaches a certain value by the second enlargement display control from the state in B of FIG. 7, the representative point Pr and the focus position Pf of the specified portion 30 in the enlarged display target range 40b coincide with the center point (origin O) of the display area 161a, as illustrated in C of FIG. 7. Note that, in a case where the representative point Pr and the focus position Pf are located in the area where y<0 (that is, in the area on the lower side of the x-axis) at the end of the second enlargement display control, the enlarged display target range 40b is adjusted such that the representative point Pr and the focus position Pf coincide with the center point (origin O). Furthermore, in a case where the representative point Pr is located in the quadrant on the lower side of the x-axis (the third quadrant or the fourth quadrant) in the object image 40 at the equal magnification, the representative point Pr may approach the x-axis from the lower side of the x-axis by the second enlargement control. In this case, in a case where the representative point Pr and the focus position Pf are located in the area where y>0 (that is, in the area on the upper side of the x-axis) at the end of the second enlargement display control, the enlarged display target range 40b is adjusted such that the representative point Pr and the focus position Pf overlap with the x-axis. In the case where the representative point Pr and the focus position Pf coincide with the center point (origin O) of the display area 161a in the second enlargement display control, the third enlargement display control is started.

In the third enlargement display control, an enlargement reference point P3 (enlargement reference portion) is set at a point located at the center point (origin O) of the display area 161a at this point of time in the object image 40, that is, at the representative point Pr, and an enlarged display target range 40c is extracted, and enlarged and displayed such that the representative point Pr is located in the middle (for example, center). As a result, the third enlarged image obtained by further enlarging the object image 40 in the state where the representative point Pr of the specified portion 30 is fixed in the middle (for example, the center point (origin O)) of the display area 161a is displayed. As a result, the desired specified portion 30 can be enlarged and observed at the center of the angle of view.

Figure 8:
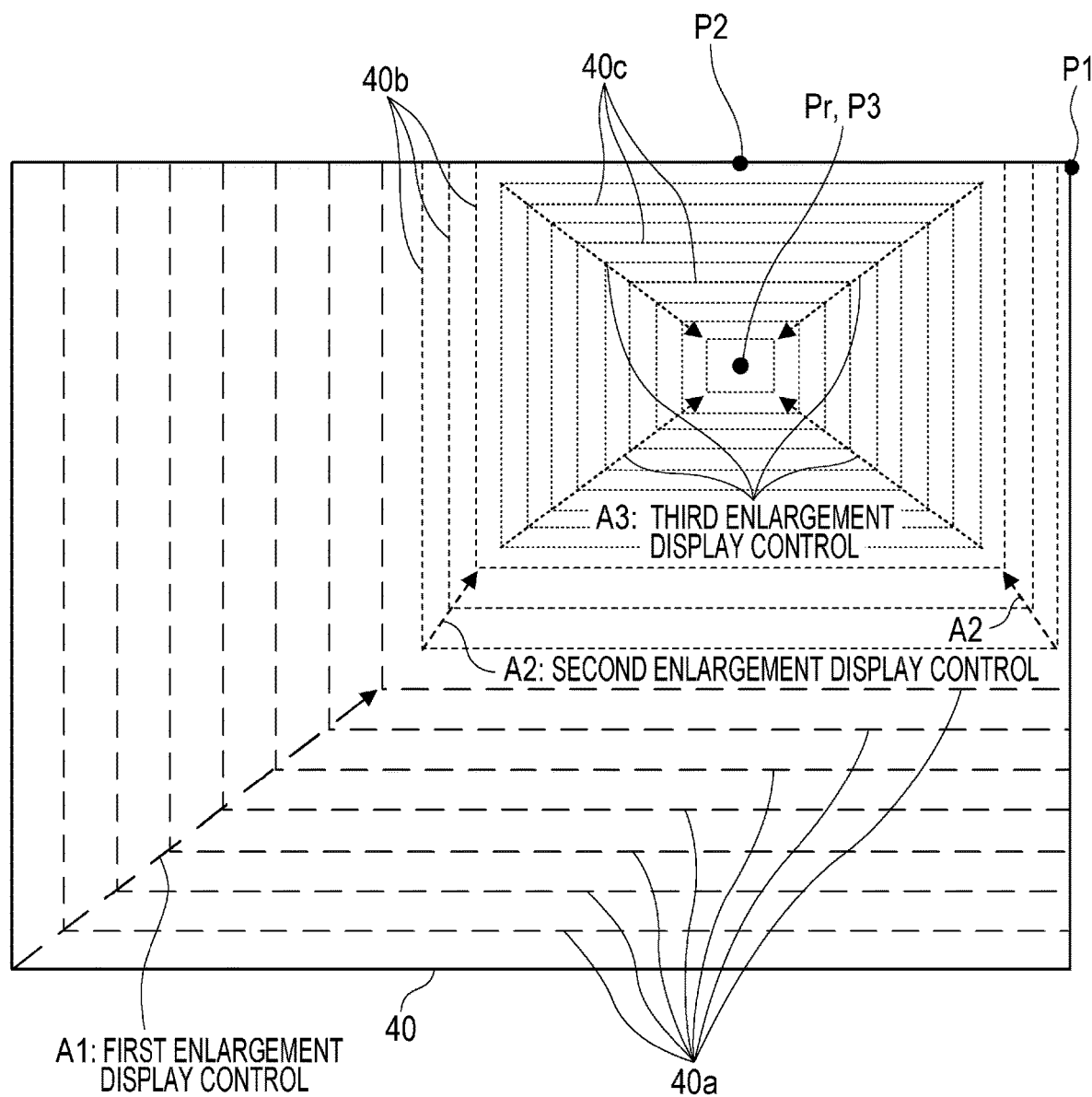
FIG. 8 is a diagram illustrating first to third enlargement display controls from a viewpoint of a display target range extracted from the object image.

FIG. 8 is a diagram for describing the first to third enlargement display controls from the viewpoint of the display target range extracted from the object image 40 in the case where the representative point Pr of the specified portion 30 is in the first quadrant of the object image 40 at the equal magnification before the enlargement.

The plurality of rectangles in FIG. 8 represent the display target ranges 40a to extracted from the object image 40 every time the enlargement button 172a is operated. In the first enlargement display control, as illustrated by the arrow A1 with wave line, the display target range 40a is extracted such that the enlargement reference point P1 set at the upper right corner is commonly included and the size gradually decreases. In a case where the display target range 40a is bilaterally symmetrical about the representative point Pr, the second enlargement display control is started. In the second enlargement display control, as illustrated by the arrow A2 with wave line, the display target range 40b is extracted such that the enlargement reference point P2 set in the middle of the upper side of the display target range 40b is commonly included and the size gradually decreases. In a case where the display target range 40b becomes vertically symmetrical about the representative point Pr, the third enlargement display control is started. In the third enlargement display control, as illustrated by the arrow A3 with wave line, the display target range 40c is extracted such that the size gradually decreases around the enlargement reference point P3 set at the representative point Pr.

Figure 9:
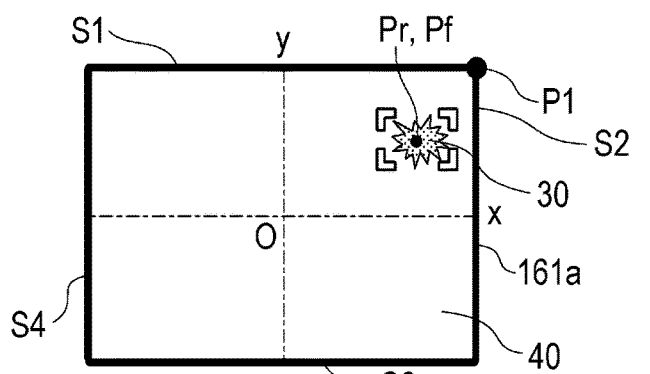
FIG. 9 is a diagram illustrating another example of the enlargement display operation of the object image.
Figure 9:
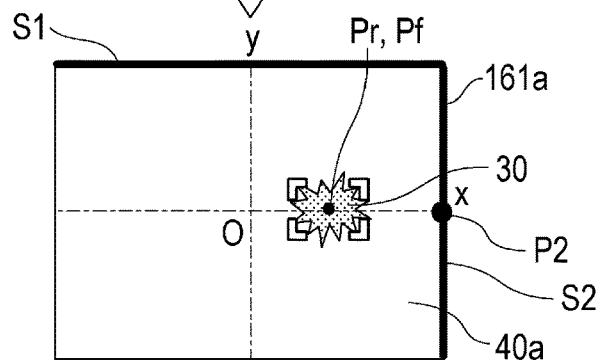
Figure 9:
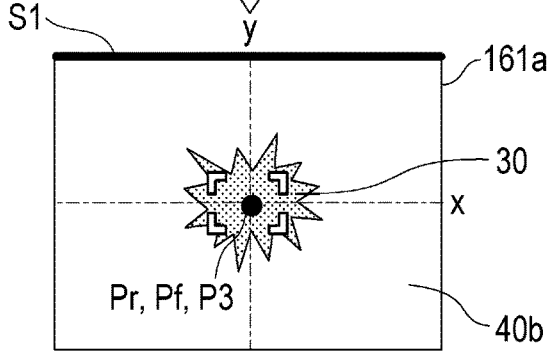
Figure 9:
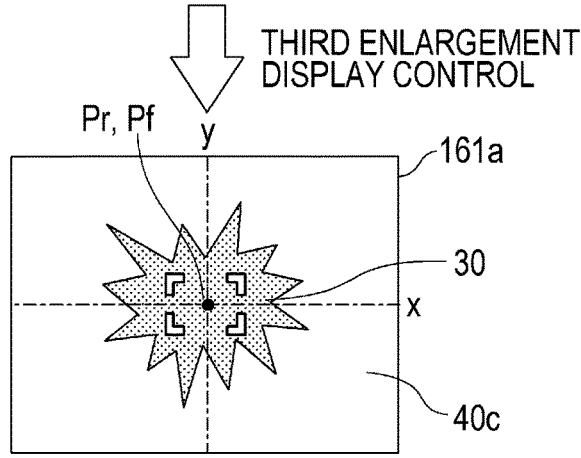

FIG. 9 is a diagram illustrating another example of the enlargement display operation of the object image 40 in the case where the representative point Pr and the focus position Pf are located in the first quadrant.

In the example illustrated in FIG. 9, in a case where the display magnification reaches a certain value by the first enlargement display control, the representative point Pr and the focus position Pf of the specified portion 30 in the enlarged display target range 40a overlap with the x-axis, as illustrated in B of FIG. 9. Note that, in a case where the representative point Pr and the focus position Pf are located in the area where y<0 (that is, in the area on the lower side of the x-axis) at the end of the first enlargement display control, the enlarged display target range 40a is adjusted such that the representative point Pr and the focus position Pf overlap with the x-axis. Furthermore, in the case where the representative point Pr is located in the quadrant on the lower side of the x-axis (the third quadrant or the fourth quadrant) in the object image 40 at the equal magnification, the representative point Pr approaches the x-axis from the lower side of the x-axis by the first enlargement control. In this case, in the case where the representative point Pr and the focus position Pf are located in the area where y>0 (that is, in the area on the upper side of the x-axis) at the end of the first enlargement display control, the enlarged display target range 40a is adjusted such that the representative point Pr and the focus position Pf overlap with the x-axis. In the case where the representative point Pr and the focus position Pf overlap with the x-axis in the first enlargement display control, the second enlargement display control is started.

In the second enlargement display control, the enlargement reference point P2 is set at the intersection of one of the x-axis or the y-axis with which the representative point Pr overlaps (the x-axis in B of FIG. 9) and the edge portion of the object image 40. Specifically, in the state of B of FIG. 9, the right side S2 of the edge portion of the object image 40 overlaps with the right side of the outer periphery of the display area 161a. Therefore, the enlargement reference point P2 is set at the intersection of the x-axis and the right side S2. The enlargement reference point P2 set as described above is located on the edge portion of the object image 40. Then, an enlarged display target range 40b is extracted from the object image 40 (from the display target range 40a) and displayed such that the enlargement reference point P2 and the specified portion 30 are contained. That is, the object image 40 is enlarged and displayed with reference to the enlargement reference point P2. By enlarging the image with reference to the enlargement reference point P2, the representative point Pr approaches the center point (origin O) of the display area 161a in the state where the position of the representative point Pr of the specified portion 30 in the y-axis direction is fixed.

In a case where the display magnification of the object image 40 reaches a certain value by the second enlargement display control from the state in B of FIG. 9, the representative point Pr and the focus position Pf of the specified portion 30 in the enlarged display target range 40b coincide with the center point (origin O) of the display area 161a, as illustrated in C of FIG. 9. Note that, in a case where the representative point Pr and the focus position Pf are located in the area where x<0 (that is, in the area on the left side of the y-axis) at the end of the second enlargement display control, the enlarged display target range 40b is adjusted such that the representative point Pr and the focus position Pf coincide with the center point (origin O) of the display area 161a. Furthermore, in the case where the representative point Pr is located in the quadrant on the left side of the y-axis (the second quadrant or the third quadrant) in the object image 40 at the equal magnification, the representative point Pr may approach the y-axis from the left side of the y-axis by the second enlargement control. In this case, in a case where the representative point Pr and the focus position Pf are located in the area where x>0 (that is, in the area on the right side of the x-axis) at the end of the second enlargement display control, the enlarged display target range 40b is adjusted such that the representative point Pr and the focus position Pf overlap with the y-axis. In the case where the representative point Pr and the focus position Pf coincide with the center point (origin O) of the display area 161a in the second enlargement display control, the third enlargement display control is started. The subsequent third enlargement display control is the same as that in FIG. 7.

The operation in the case where the representative point Pr and the focus position Pf are located in the second to fourth quadrants in the object image 40 at the equal magnification corresponds to an operation obtained by inverting the operation in FIG. 7 or 9 about the x-axis and/or the y-axis.

For example, the operation in the case where the representative point Pr and the focus position Pf are located in the second quadrant corresponds to an operation obtained by inverting FIG. 7 or FIG. 9 around the y-axis. In this case, in the first enlargement display control, the enlargement reference point P1 is set at the upper left corner where the upper side S1 and the left side S4 intersect in the edge portion of the object image 40. Furthermore, in the case where the representative point Pr and the focus position Pf overlap with the portion of y>0 in the y-axis in the first enlargement display control, the enlargement reference point P2 is set at the intersection of the upper side S1 of the edge portion of the object image 40 and the y-axis in the second enlargement display control. In the case where the representative point Pr and the focus position Pf overlap with the portion of x<0 in the x-axis in the first enlargement display control, the enlargement reference point P2 is set at the intersection of the left side S4 of the edge portion of the object image 40 and the x-axis in the second enlargement display control.

Furthermore, the operation in the case where the representative point Pr and the focus position Pf are located in the third quadrant corresponds to an operation obtained by inverting FIG. 7 or FIG. 9 around the x-axis and the y-axis. In this case, in the first enlargement display control, the enlargement reference point P1 is set at the lower left corner where the lower side S3 and the left side S4 intersect in the edge portion of the object image 40. Furthermore, in the case where the representative point Pr and the focus position Pf overlap with the portion of y<0 in the y-axis in the first enlargement display control, the enlargement reference point P2 is set at the intersection of the lower side S3 of the edge portion of the object image 40 and the y-axis in the second enlargement display control. In the case where the representative point Pr and the focus position Pf overlap with the portion of x<0 in the x-axis in the first enlargement display control, the enlargement reference point P2 is set at the intersection of the left side S4 of the edge portion of the object image 40 and the x-axis in the second enlargement display control.

Furthermore, the operation in the case where the representative point Pr and the focus position Pf are located in the fourth quadrant corresponds to an operation obtained by inverting FIG. 7 or FIG. 9 around the x-axis. In this case, in the first enlargement display control, the enlargement reference point P1 is set at the lower right corner where the right side S2 and the lower side S3 intersect in the edge portion of the object image 40. Furthermore, in the case where the representative point Pr and the focus position Pf overlap with the portion of y<0 in the y-axis in the first enlargement display control, the enlargement reference point P2 is set at the intersection of the lower side S3 of the edge portion of the object image 40 and the y-axis in the second enlargement display control. In the case where the representative point Pr and the focus position Pf overlap with the portion of x>0 in the x-axis in the first enlargement display control, the enlargement reference point P2 is set at the intersection of the right side S2 of the edge portion of the object image 40 and the x-axis in the second enlargement display control.

In the case where the representative point Pr and the focus position Pf are located on the x-axis or the y-axis and do not coincide with the center point (origin O) of the display area 161a in a case where the object image 40 at the equal magnification is displayed in the display area 161a, the first enlargement display control is omitted, and the second enlargement display control and the third enlargement display control are sequentially executed. Furthermore, in the case where the representative point Pr and the focus position Pf are located at the center point (origin O) of the display area 161a in a case where the object image 40 at the equal magnification is displayed in the display area 161a, the first enlargement display control and the second enlargement display control are omitted, and the third enlargement display control is executed.

Next, a control procedure of enlargement display processing for performing the first to third enlargement display controls will be described.

Figure 10:
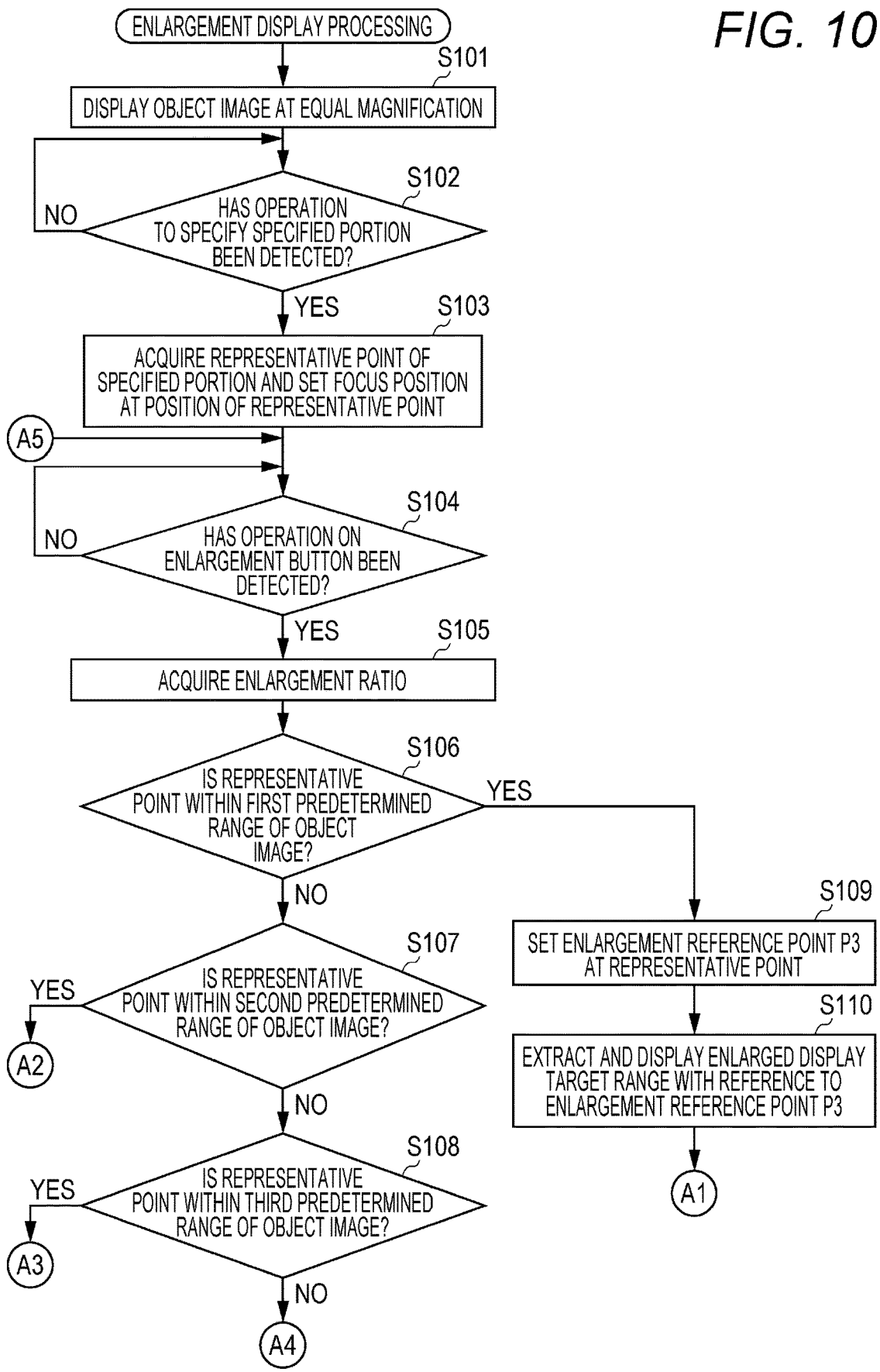
FIG. 10 is a flowchart illustrating a control procedure of enlargement display processing.
Figure 11:
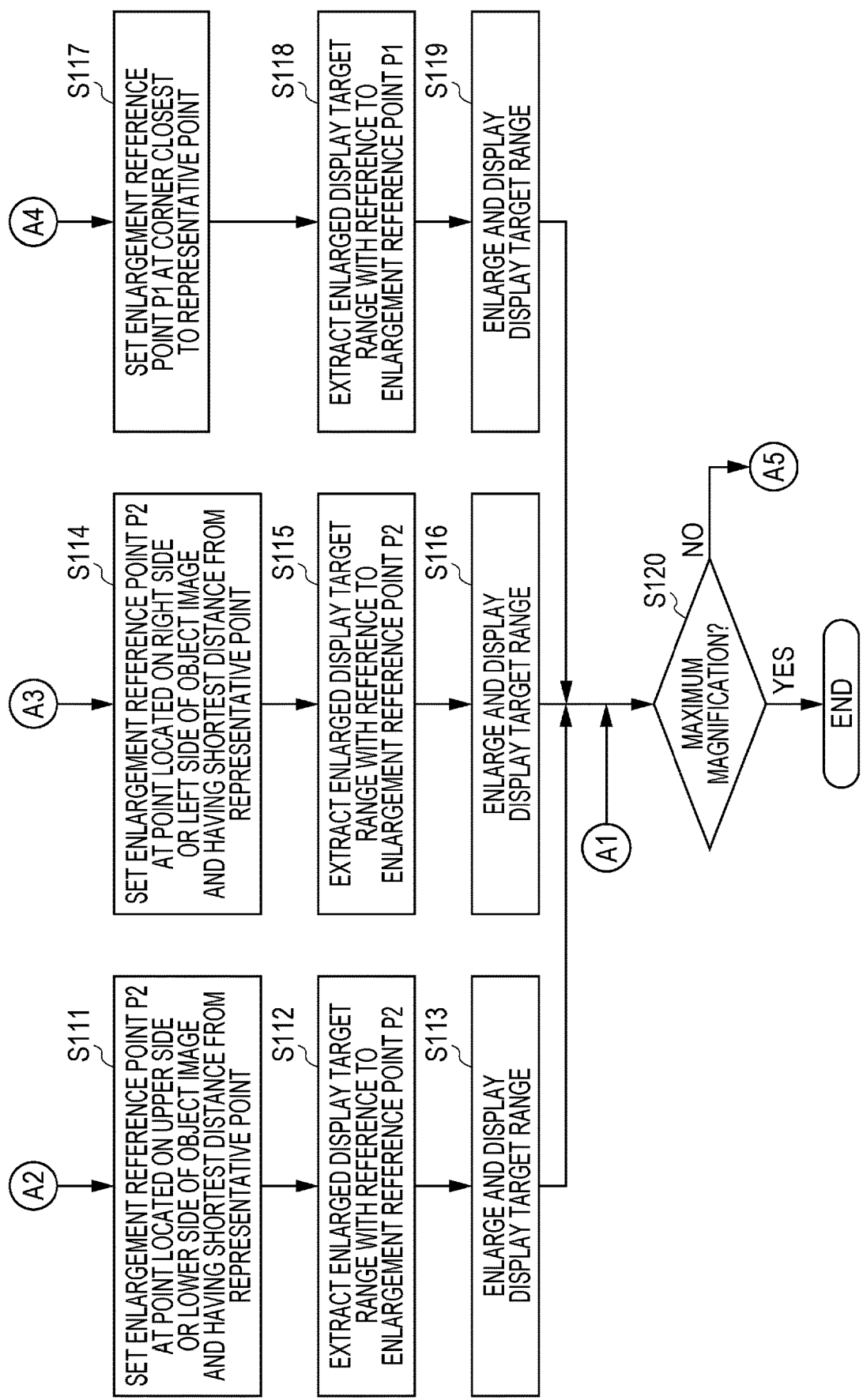
FIG. 11 is a flowchart illustrating the control procedure of the enlargement display processing.

FIGS. 10 and 11 are flowcharts illustrating a control procedure by the CPU 11 of the enlargement display processing.

In a case where the enlargement display processing is started, the CPU 11 displays the object image 40 at the equal magnification in the display area 161a on the basis of the image data received from the imaging unit 14 (step S101).

The CPU 11 determines whether the operation to specify the specified portion has been detected (step S102). Here, in the case where the contact operation is performed on the display area 161a of the touch panel 171, the CPU 11 determines that the operation to specify the specified portion 30 has been detected. In the case where it is determined that the operation has not been detected ("NO" in step S102), the CPU 11 executes step S102 again. In the case where it is determined that the operation has been detected ("YES" in step S102), the CPU 11 acquires a point corresponding to the point where the contact operation has been performed in the object image 40 as the representative point Pr of the specified portion 30, and sets the focus position Pf at the position of the representative point Pr on the display area 161a (step S103). According to this setting, the CPU 11 displays the focus mark 161c centered on the focus position Pf in the display area 161a.

In a case where step S103 ends, the CPU 11 determines whether the operation on the enlargement button 172a has been detected (step S104), and in the case where it is determined that the operation has not been detected ("NO" in step S104), step S104 is executed again. In the case where it is determined that the operation has been detected ("YES" in step S104), the CPU 11 acquires the enlargement ratio corresponding to the operation (step S105). That is, the CPU 11 adds a predetermined increase value (for example, 0.1) to the enlargement ratio before the execution of step S104 to obtain the enlargement ratio according to the above operation. Furthermore, the CPU 11 determines whether the representative point Pr is within a first range R1 of the object image 40 (step S106).

Figure 12:
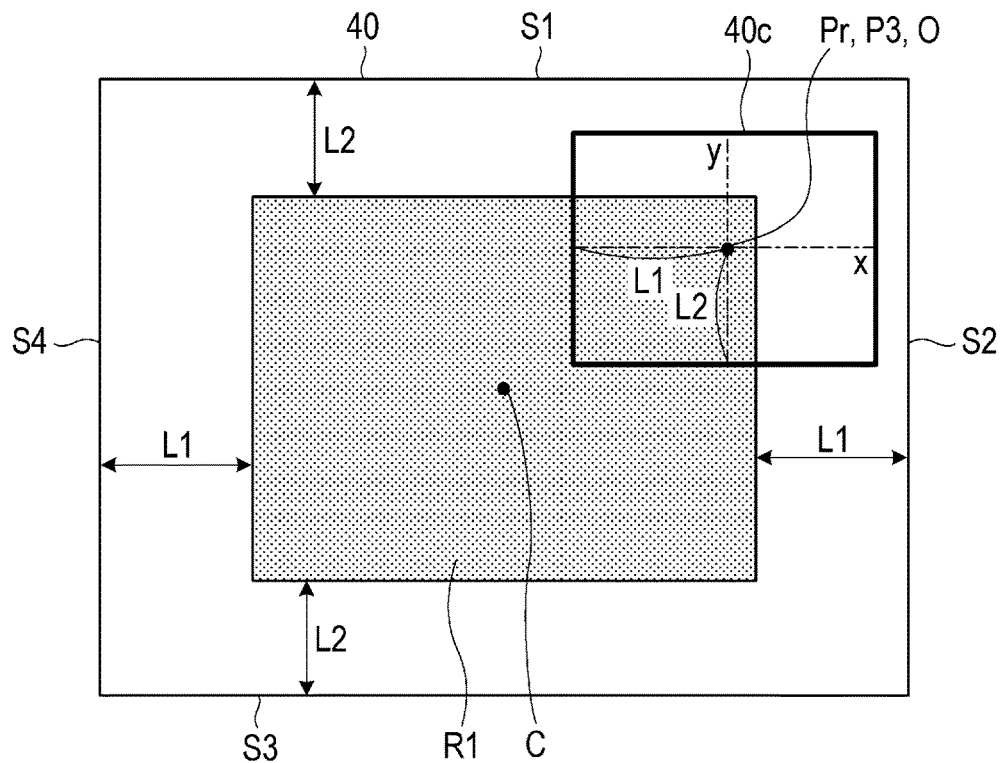
FIG. 12 is a diagram illustrating the first range.

FIG. 12 is a diagram illustrating the first range R1.

The first range R1 is a rectangular range similar in shape to the object image 40. The center of the first range R1 coincides with a center C of the object image 40. The size of the first range R1 is adjusted according to the enlargement ratio acquired in step S105. Specifically, the size of the first range R1 is adjusted such that the center of the display target range in a case of assuming that the display target range is extracted from the object image 40 according to the acquired enlargement ratio and such that the representative point Pr of the specified portion 30 is located at the center (origin O) of the display target range is located within the range of the first range RE In other words, in a case where ½ of the width in the x direction of the display target range of the acquired enlargement ratio is a length L1, and ½ of the width in the y direction of the display target range is a length L2, the first range R1 is a rectangle in which the distance from each of the right side S2 and the left side S4 of the object image 40 is the length L1, and the distance from each of the upper side S1 and the lower side S3 of the object image 40 is the length L2. Therefore, the first range R1 is set to be larger as the enlargement ratio is larger. In the case where the representative point Pr is within the first range R1, the enlarged display target range 40c having the representative point Pr as the origin O can be extracted at the acquired enlargement ratio, as illustrated in FIG. 12. Therefore, the enlargement reference point P3 is set at the representative point Pr, and the third enlargement display control is performed. Note that the size of the first range R1 may be adjusted such that the middle of the display target range in a case of assuming that the display target range is extracted from the object image 40 according to the acquired enlargement ratio and such that the representative point Pr of the specified portion 30 is located in the middle (in a predetermined range near the center) of the display target range is located within the range of the first range R1.

Returning to FIG. 10, in the case where it is determined that the representative point Pr is within the first range R1 of the object image 40 ("YES" in step S106), the CPU 11 executes the third enlargement display control. That is, the CPU 11 sets the enlargement reference point P3 at the representative point Pr (step S109), and extracts the enlarged display target range 40c with reference to the enlargement reference point P3 and displays the display target range in the display area 161a (step S110).

In the case where it is determined that the representative point Pr is not within the first range R1 of the object image 40 ("NO" in step S106), the CPU 11 determines whether the representative point Pr is within a second range R2 of the object image 40 (step S107).

Figure 13:
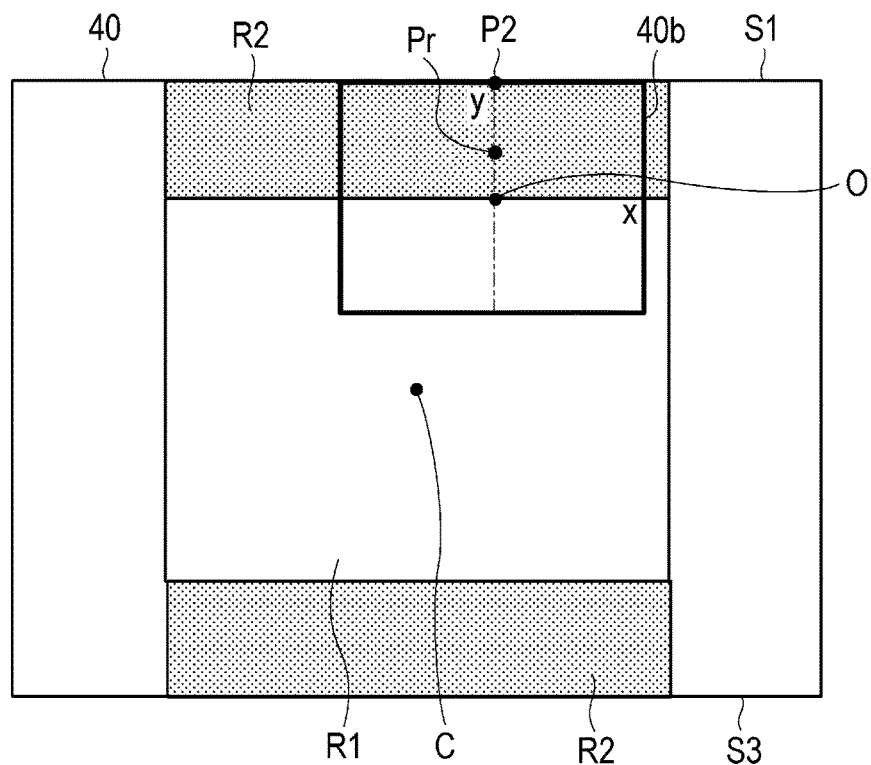
FIG. 13 is a diagram illustrating the second range.

FIG. 13 is a diagram illustrating the second range R2.

The second range R2 is a rectangular range corresponding to a portion above the first range R1 (+y direction side, one side with respect to a second direction) and a portion below the first range R1 (−y direction side, the other side in the second direction) in the object image 40. The second range R2 located above the first range R1 is a rectangular range having a lower side in contact with the upper side of the first range R1 and the upper side S1 of the object image 40 and having a width in a left-right direction (x direction, a first direction) equal to that of the first range R1. The second range R2 located below the first range R1 is a rectangular range having an upper side in contact with the lower side of the first range R1 and the lower side S3 of the object image 40 and having a width in the left-right direction (x direction) equal to that of the first range R1. The size of the second range R2 is adjusted in conjunction with the adjustment of the size of the first range R1. Therefore, the width in the left-right direction of the second range R2 is set to be larger as the enlargement ratio acquired in step S105 is larger, and the width in an up-down direction is set to be smaller as the acquired enlargement ratio is larger. In the case where the representative point Pr is within the upper second range R2, the display target range 40b in which the representative point Pr is located in the range of y>0 on the y-axis and the upper side overlaps with the upper side S1 of the object image 40 can be extracted at the acquired enlargement ratio, as illustrated in FIG. 13. Furthermore, in the case where the representative point Pr is within the lower second range R2, the display target range 40b in which the representative point Pr is located in the range of y<0 on the y-axis and the lower side overlaps with the lower side S3 of the object image 40 can be extracted at the acquired enlargement ratio. To extract such a display target range 40b, in the case where the representative point Pr is within the second range R2, the enlargement reference point P2 is set to a point (corresponding to the intersection of the y-axis and the edge portion of the object image 40) which is located on one of the upper side S1 or the lower side S3 of the object image 40 and having the shortest distance from the representative point Pr, and the second enlargement display control is performed.

Returning to FIG. 10, in the case where it is determined that the representative point Pr is within the second range R2 of the object image 40 ("YES" in step S107), the CPU 11 executes the second enlargement display control. That is, first, the CPU 11 sets the enlargement reference point P2 at a point (corresponding to the intersection of the y-axis in the extracted display target range 40b and the edge portion of the object image 40) which is located on one of the upper side S1 or the lower side S3 of the object image 40 and having the shortest distance from the representative point Pr (step S111 in FIG. 11). Specifically, in the case where the representative point Pr is within the upper second range R2, the enlargement reference point P2 is set on the upper side S1 of the object image 40, and in the case where the representative point Pr is within the lower second range R2, the enlargement reference point P2 is set on the lower side S3 of the object image 40.

The CPU 11 extracts the enlarged display target range 40b with reference to the enlargement reference point P2 (step S112). Further, the CPU 11 resets the focus position Pf at the display position of the representative point Pr in the enlarged display target range 40b, of the display area 161a.

The CPU 11 enlarges the extracted display target range 40b and displays the display target range in the display area 161a (step S113). Further, the CPU 11 displays the focus mark 161c at the set focus position Pf.

In step S107 of FIG. 10, in the case where it is determined that the representative point Pr is not within the second range R2 of the object image 40 ("NO" in step S107), the CPU 11 determines whether the representative point Pr is within the third range R3 of the object image 40 (step S108).

Figure 14:
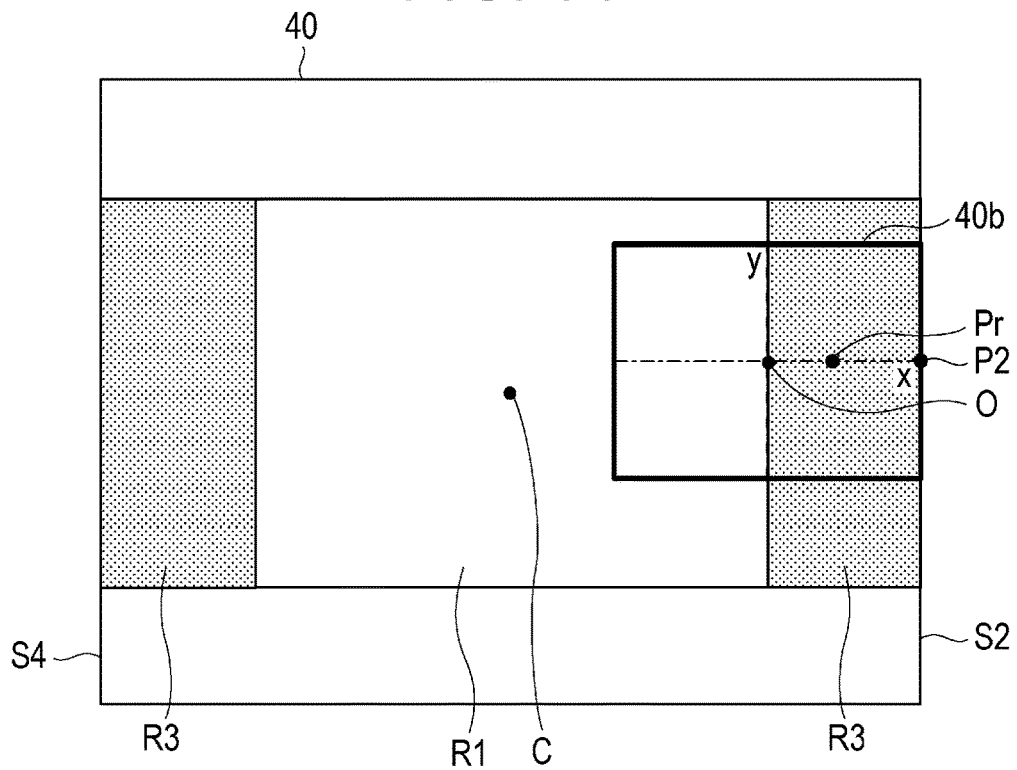
FIG. 14 is a diagram illustrating the third range.

FIG. 14 is a diagram illustrating the third range R3.

The third range R3 is a rectangular range corresponding to a portion on the right side of the first range R1 (+x direction side, one side with respect to the first direction) and a portion on the left side of the first range R1 (−x direction side, the other side in the first direction) in the object image 40. The third range R3 located on the right side of the first range R1 is a rectangular range having a left side in contact with the right side of the first range R1 and the right side S2 of the object image 40 and having a width in the up-down direction (y direction, the second direction) equal to that of the first range R1. The third range R3 located on the left side of the first range R1 is a rectangular having a right side in contact with the left side of the first range R1 and the left side S4 of the object image 40 and having a width in the up-down direction (y direction) equal to that of the first range R1. The size of the third range R3 is adjusted in conjunction with the adjustment of the size of the first range R1. Therefore, the width in the up-down direction of the third range R3 is set to be larger as the enlargement ratio acquired in step S105 is larger, and the width in the right-left direction is set to be smaller as the acquired enlargement ratio is larger. In the case where the representative point Pr is within the right third range R3, the display target range 40b in which the representative point Pr is located in the range of x>0 on the x-axis and the right side overlaps with the right side S2 of the object image 40 can be extracted at the acquired enlargement ratio, as illustrated in FIG. 14. Furthermore, in the case where the representative point Pr is within the left third range R3, the display target range 40b in which the representative point Pr is located in the range of x<0 on the x-axis and the left side overlaps with the left side S4 of the object image 40 can be extracted at the acquired enlargement ratio. To extract such a display target range 40b, in the case where the representative point Pr is within the third range R3, the enlargement reference point P2 is set to a point (corresponding to the intersection of the x-axis and the edge portion of the object image 40) which is located on one of the right side S2 or the left side S4 of the object image 40 and having the shortest distance from the representative point Pr, and the second enlargement display control is performed.

Returning to FIG. 10, in the case where it is determined that the representative point Pr is within the third range R3 of the object image 40 ("YES" in step S108), the CPU 11 executes the second enlargement display control. That is, first, the CPU 11 sets the enlargement reference point P2 at a point (corresponding to the intersection of the x-axis in the extracted display target range 40b and the edge portion of the object image 40) which is located on one of the right side S2 or the left side S4 of the object image 40 and having the shortest distance from the representative point Pr (step S114 in FIG. 11). Specifically, in the case where the representative point Pr is within the right third range R3, the enlargement reference point P2 is set on the right side S2 of the object image 40, and in the case where the representative point Pr is within the left third range R3, the enlargement reference point P2 is set on the left side S4 of the object image 40.

The CPU 11 extracts the enlarged display target range 40b with reference to the enlargement reference point P2 (step S115). Further, the CPU 11 resets the focus position Pf at the display position of the representative point Pr in the enlarged display target range 40b, of the display area 161a.

The CPU 11 enlarges the extracted display target range 40b and displays the display target range in the display area 161a (step S116). Further, the CPU 11 displays the focus mark 161c at the set focus position Pf.

In step S108 of FIG. 10, in the case where it is determined that the representative point Pr is not within the third range R3 of the object image 40 ("NO" in step S108), it is determined that the representative point Pr is within a fourth range R4 of the object image 40

Figure 15:
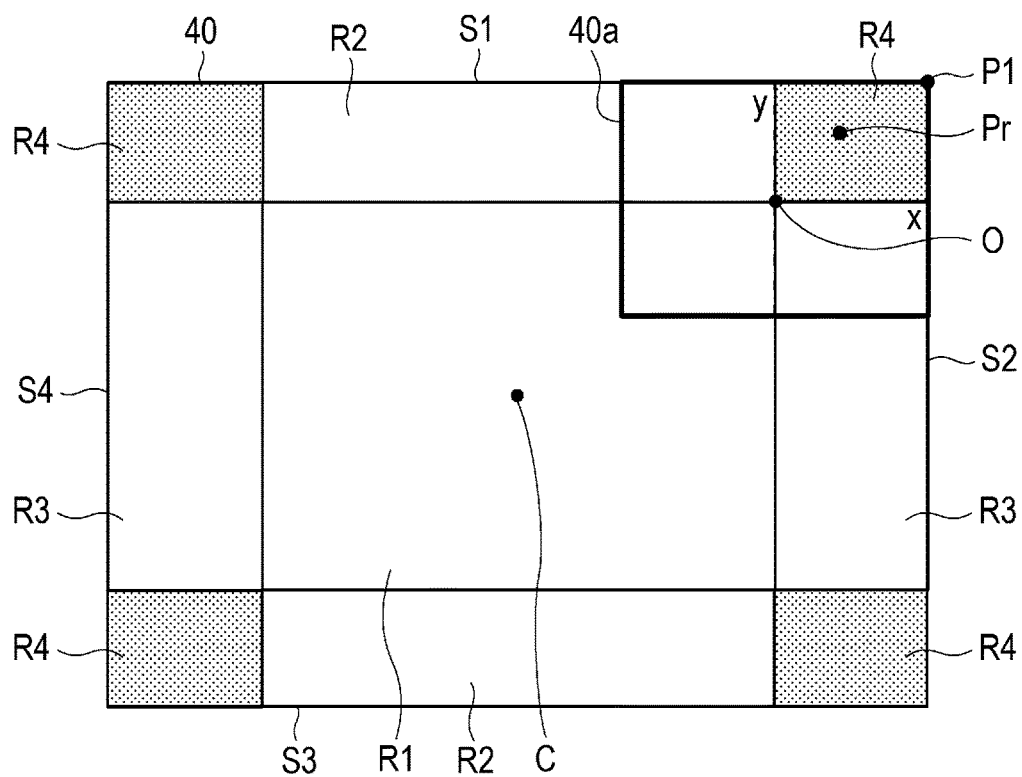
FIG. 15 is a diagram illustrating a fourth range.

FIG. 15 is a diagram illustrating the fourth range R4.

The fourth range R4 is a range excluding the first range R1, the second range R2, and the third range R3 in the object image 40. Therefore, the fourth range R4 is a rectangular range located at four locations corresponding to the four corners of the object image 40. The size of the fourth range R4 is adjusted in conjunction with the adjustment of the size of the first range R1. Therefore, the widths in the up-down direction and the right-left direction of the fourth range R4 are set to be smaller as the enlargement ratio acquired in step S105 is larger. In the case where the representative point Pr is within the fourth range R4, the enlargement reference point P1 is set at the corner closest to the representative point Pr among the four corners of the object image 40, and the first enlargement display control is performed.

Returning to FIG. 10, in the case where it is determined that the representative point Pr is not within the third range R3 of the object image 40 (that is, the representative point is within the fourth range R4) ("NO" in step S108), the CPU 11 executes the first enlargement display control. That is, the CPU 11 first sets the enlargement reference point P1 at the corner closest to the representative point Pr among the four corners of the object image 40 (step S117 in FIG. 11). Specifically, in the case where the representative point Pr is within the upper right fourth range R4, the enlargement reference point P1 is set at the upper right corner of the object image 40 (see FIG. 15). Further, in the case where the representative point Pr is within the upper left fourth range R4, the enlargement reference point P1 is set at the upper left corner of the object image 40. Further, in the case where the representative point Pr is within lower left fourth range R4, the enlargement reference point P1 is set at the lower left corner of the object image 40. Further, in the case where the representative point Pr is within the lower right fourth range R4, the enlargement reference point P1 is set at the lower right corner of the object image 40.

The CPU 11 extracts the enlarged display target range 40a with reference to the enlargement reference point P1 (step S118). Further, the CPU 11 resets the focus position Pf at the display position of the representative point Pr in the enlarged display target range 40a, of the display area 161a.

The CPU 11 enlarges the extracted display target range 40a and displays the display target range in the display area 161a (step S119). Further, the CPU 11 displays the focus mark 161c at the set focus position Pf.

In a case where any of steps S110, S113, S116, and S119 is completed, the CPU 11 determines whether the magnification has reached the displayable maximum magnification (step S120). In the case where it is determined that the magnification has not reached the maximum magnification ("NO" in step S120), the CPU 11 returns the processing to step S104 in FIG. 10 and receives the next operation on the enlargement button 172a. In a case where it is determined that the magnification has reached the maximum magnification ("YES" in step S120), the CPU 11 terminates the enlargement display processing.

In this manner, the CPU 11 extracts any of the plurality of mutually different display target ranges each including the specified portion 30 from the object image 40 according to the acquired position of the specified portion 30 and the acquired enlargement ratio, and enlarges and displays the extracted display target range in the display area 161a. Steps S117 to S119 of the above-described enlargement display processing correspond to the first enlargement display control, steps S111 to S113 and steps S114 to S116 correspond to the second enlargement display control, and steps S109 and S110 correspond to the third enlargement display control.

<Reduction Display Operation of Object Image>

Next, an operation of reducing and displaying the object image 40 according to the operation on the reduction button 172b will be described.

Figure 16:
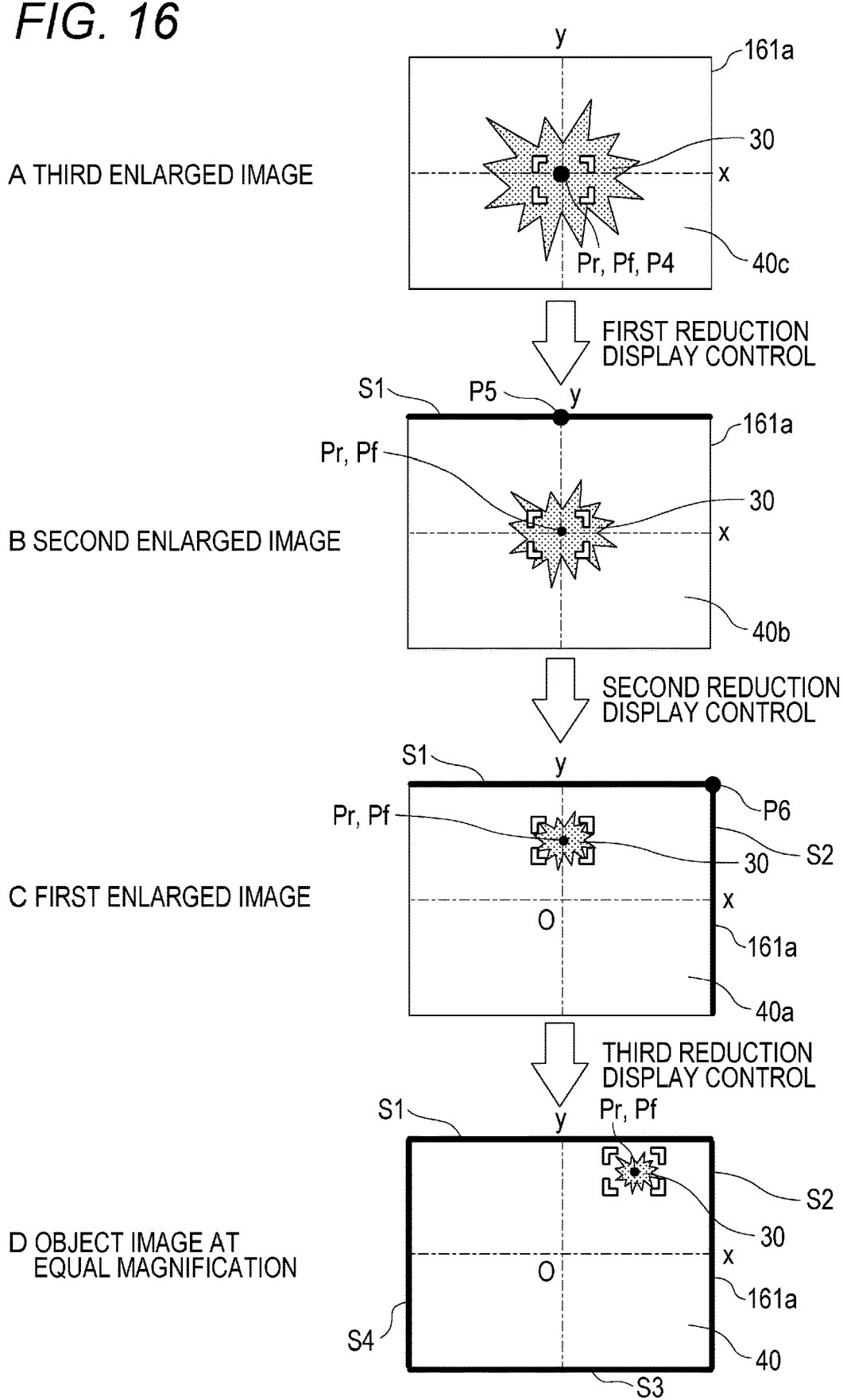
FIG. 16 is a diagram for describing a reduction display operation of an object image.

FIG. 16 is a diagram illustrating an example of a reduction display operation of the object image 40.

The reduction display operation is performed in a case where the reduction button 172b is operated while a part of the object image 40 is enlarged and displayed by the above-described enlargement display operation. Here, a case where the reduction button 172b is operated in a case where the third enlarged image illustrated in D of FIG. 9 is displayed will be exemplified.

A of FIG. 16 illustrates a state in which the third enlarged image (display target range 40c) is displayed in the display area 161a. In a case where the reduction button 172b is operated once or a plurality of times in the state of A of FIG. 16, a first reduction display control is performed every time the reduction button is operated, and the second enlarged image illustrated in B of FIG. 16 is displayed in the display area 161a. In a case where the reduction button 172b is operated once or a plurality of times in the state of B of FIG. 16, a second reduction display control is performed every time the reduction button is operated, and the first enlarged image illustrated in C of FIG. 16 is displayed in the display area 161a. In a case where the reduction button 172b is operated once or a plurality of times in the state of C of FIG. 16, a third reduction display control is performed every time the reduction button is operated, and the object image 40 at the equal magnification illustrated in D of FIG. 16 is displayed in the display area 161a. The display target range 40c at an intermediate display magnification between A and B in FIG. 16 may be displayed according to the number of times of the operation of the enlargement button 172a or the like. Similarly, the display target range 40b at an intermediate display magnification between B and C of FIG. 16 may be displayed, and the display target range 40a at an intermediate display magnification between C and D of FIG. 16 may be displayed. Hereinafter, the first to third reduction display controls will be described.

The third enlarged image in the state where the focus position Pf and the representative point Pr overlap with the center point (origin O) of the display area 161a is displayed in the display area 161a in A of FIG. 16. In the first reduction display control started in response to the operation of the reduction button 172b, a reduction reference point P4 (reduction reference portion) is set at a point corresponding to the center point (origin O) in the object image 40, that is, at the representative point Pr, and the object image 40 is reduced and displayed with the reduction reference point P4. Here, "to reduce and display an image with reference to the reduction reference point" means to reduce an image in a mode in which the position of the reduction reference point in the display area 161a is the same before and after the reduction. Therefore, the reduced display target range is extracted, and reduced and displayed such that the reduction reference point P4 is at the center.

In a case where the display magnification of the object image 40 decreases to a certain value by the first reduction display control from the state in A of FIG. 16, any one side of the edge portion of the object image 40 overlaps with any one side of the outer periphery of the display area 161a, as illustrated in B of FIG. 16. In the example illustrated in B of FIG. 16, the upper side S1 of the edge portion of the object image 40 overlaps with the upper side of the outer periphery of the display area 161a. The display target range at this time corresponds to the display target range 40b illustrated in C of FIG. 7. Note that, since the display magnification in the reduction display control decreases in stages at a constant decrease value, even if the display magnification is reduced to a display magnification at which one side of the extracted display target range and one side of the edge portion of the object image 40 can overlap, the one sides may not overlap with each other, depending on the position of the representative point Pr. In this case, the display magnification may be finely adjusted such that one side of the display target range overlaps with one side of the edge portion of the object image 40. Alternatively, adjustment to shift (translating) the extraction range of the display target range may be performed such that one side of the display target range overlaps with one side of the edge portion of the object image 40.

In a case where the reduction button 172b is operated in this state, the second reduction display control is started. In the second reduction display control, a reduction reference point P5 (reduction reference portion) is set at a point corresponding to an intersection of a side (here, the upper side S1) overlapping with the outer periphery of the display area 161a, of the edge portion of the object image 40, and the x-axis or the y-axis (here, the y-axis). Then, the object image 40 is reduced and displayed with reference to the reduction reference point P5. By reducing an image with reference to the reduction reference point P5, the representative point Pr of the specified portion 30 is separated from the center point (origin O) of the display area 161a and approaches the outer periphery of the display area 161a. Further, the focus position Pf is changed to the display position of the reduced representative point Pr. Thereby, a portion outside the range of the object image 40 can be prevented from being displayed in the display area 161a after the reduction.

In a case where the display magnification of the object image 40 decreases to a certain value by the second reduction display control from the state in B of FIG. 16, two orthogonal sides of the edge portion of the object image 40 overlap with two orthogonal sides of the outer periphery of the display area 161a, as illustrated in C of FIG. 16. In the example illustrated in C of FIG. 16, the upper side S1 and the right side S2 of the edge portion of the object image 40 overlap with the upper side and the right side of the outer periphery of the display area 161a. The display target range at this time corresponds to the display target range 40a illustrated in B of FIG. 7. In the second reduction display control as well, the two sides of the extracted display target range and the two sides of the edge portion of the object image 40 may not overlap with each other even if the display magnification is reduced to a display magnification at which the two sides can overlap with each other, depending on the position of the representative point Pr. In this case, the display magnification may be finely adjusted such that two sides of the display target range overlap with two sides of the edge portion of the object image 40. Alternatively, adjustment to shift the extraction range of the display target range in the x direction and/or the y direction may be performed such that the two sides of the display target range overlap with the two sides of the edge portion of the object image 40.

In a case where the reduction button 172b is operated in this state, the third reduction display control is started. In the third reduction display control, a reduction reference point P6 (reduction reference portion) is set at a point (here, the upper right corner where the upper side S1 and the right side S2 intersect in the object image 40) corresponding to an intersection of the two orthogonal sides of the display area 161a. Then, the object image 40 is reduced and displayed with reference to the reduction reference point P6. By reducing an image with reference to the reduction reference point P6, the representative point Pr of the specified portion 30 is further separated from the center point (origin O) of the display area 161a and approaches the corner of the display area 161a. Further, the focus position Pf is changed to the display position of the reduced representative point Pr.

In a case where the object image 40 is reduced by the third reduction display control from the state in C of FIG. 16, the object image 40 at the equal magnification is displayed in the display area 161a as illustrated in D of FIG. 16. In a case where the object image 40 at the equal magnification is displayed, the upper side S1, the right side S2, the lower side S3, and the left side S4 of the object image 40 are located on the outer periphery of the display area 161a.

Figure 17:
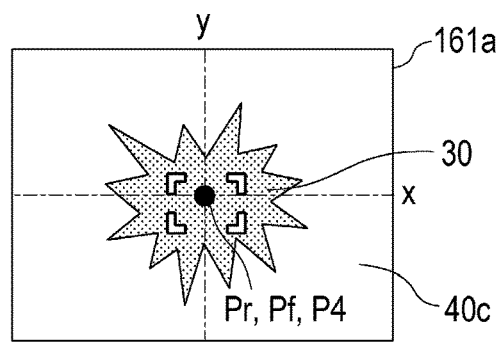
FIG. 17 is a diagram illustrating another example of the reduction display operation of the object image.
Figure 17:
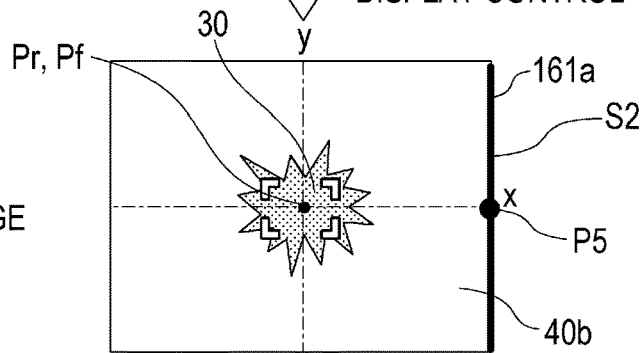
Figure 17:
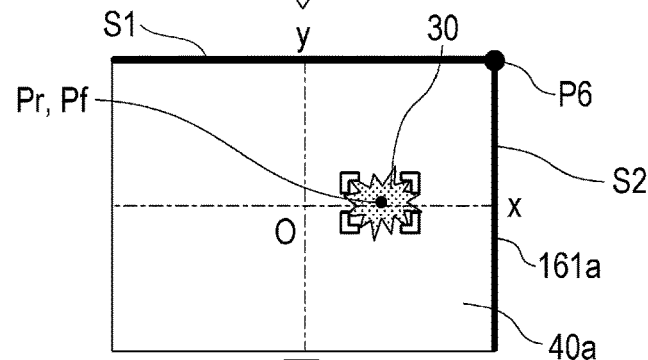
Figure 17:
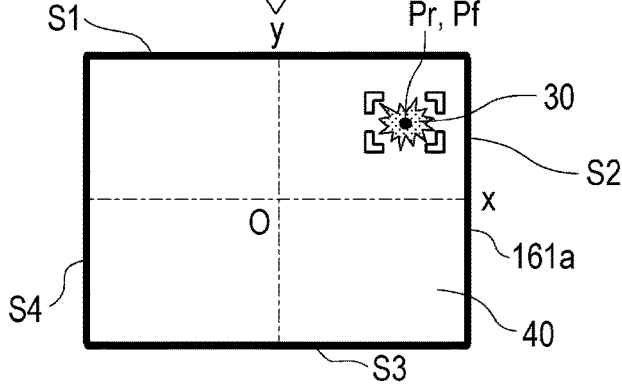

FIG. 17 is a diagram illustrating another example of the reduction display operation of the object image 40.

In FIG. 17, the position of the representative point Pr in the object image 40 at the equal magnification is different from that in FIG. 16. In the example illustrated in FIG. 17, in a case where the display magnification decreases to a certain value by the first reduction display control, the right side S2 of the object image 40 overlaps with the right side of the outer periphery of the display area 161a as illustrated in B of FIG. 17. In the second reduction display control started after the state of B of FIG. 16, the reduction reference point P5 is set at the intersection of the x-axis and the right side S2 overlapping with the outer periphery of the display area 161a, of the edge portion of the object image 40, and the object image 40 is reduced and displayed with reference to the reduction reference point P5. As described above, in the second reduction display control, the reduction reference point P5 is set on the side of the object image 40, the side first overlapping with the outer periphery of the display area 161a.

In a case where the display magnification of the object image 40 decreases to a certain value by the second reduction display control from the state in B of FIG. 17, the upper side S1 and the right side S2 of the edge portion of the object image 40 overlap with the upper side and the right side of the outer periphery of the display area 161a. Subsequent third reduction display control is the same as that in FIG. 16.

The operation in the case where the representative point Pr and the focus position Pf are located in the second to fourth quadrants in the object image 40 at the equal magnification corresponds to an operation obtained by inverting the operation in FIG. 16 or 17 about the x-axis and/or the y-axis.

For example, the operation in the case where the representative point Pr and the focus position Pf are located in the second quadrant corresponds to an operation obtained by inverting FIG. 16 or FIG. 17 around the y-axis. In this case, by the first reduction display control, the upper side S1 of the edge portion of the object image 40 overlaps with the upper side of the outer periphery of the display area 161a, or the left side S4 of the edge portion of the object image 40 overlaps with the left side of the outer periphery of the display area 161a. Further, in the second reduction display control, the reduction reference point P5 is set at an intersection of a side overlapping with the outer periphery of the display area 161a, of the edge portion of the object image 40, and the x-axis or the y-axis (an intersection of the upper side S1 and the y-axis or an intersection of the left side S4 and the x-axis). Further, in the second reduction display control, the upper side S1 and the left side S4 of the edge portion of the object image 40 overlap with the upper side and the left side of the outer periphery of the display area 161a. Further, in the third reduction display control, the reduction reference point P6 is set at the upper left corner where the upper side S1 and the left side S4 intersect in the object image 40.

Furthermore, the operation in the case where the representative point Pr and the focus position Pf are located in the third quadrant corresponds to an operation obtained by inverting FIG. 16 or FIG. 17 around the x-axis and the y-axis. In this case, by the first reduction display control, the lower side S3 of the edge portion of the object image overlaps with the lower side of the outer periphery of the display area 161a, or the left side S4 of the edge portion of the object image 40 overlaps with the left side of the outer periphery of the display area 161a. Further, in the second reduction display control, the reduction reference point P5 is set at an intersection of a side overlapping with the outer periphery of the display area 161a, of the edge portion of the object image 40, and the x-axis or the y-axis (an intersection of the lower side S3 and the y-axis or an intersection of the left side S4 and the x-axis). Further, in the second reduction display control, the lower side S3 and the left side S4 of the edge portion of the object image 40 overlap with the lower side and the left side of the outer periphery of the display area 161a. Further, in the third reduction display control, the reduction reference point P6 is set at the lower left corner where the lower side S3 and the left side S4 intersect in the object image 40.

Furthermore, the operation in the case where the representative point Pr and the focus position Pf are located in the fourth quadrant corresponds to an operation obtained by inverting FIG. 16 or FIG. 17 around the x-axis. In this case, by the first reduction display control, the right side S2 of the edge portion of the object image 40 overlaps with the right side of the outer periphery of the display area 161a, or the lower side S3 of the edge portion of the object image 40 overlaps with the lower side of the outer periphery of the display area 161a. Further, in the second reduction display control, the reduction reference point P5 is set at an intersection of a side overlapping with the outer periphery of the display area 161a, of the edge portion of the object image 40, and the x-axis or the y-axis (an intersection of the right side S2 and the x-axis or an intersection of the lower side S3 and the y-axis). Further, in the second reduction display control, the right side S2 and the lower side S3 of the edge portion of the object image 40 overlap with the right side and the lower side of the outer periphery of the display area 161a. Further, in the third reduction display control, the reduction reference point P6 is set at the lower right corner where the right side S2 and the lower side S3 intersect in the object image 40.

Further, in the case where the representative point Pr and the focus position Pf are located on the x-axis or the y-axis in a case where the object image 40 at the equal magnification is displayed in the display area 161a, the second reduction display control can reduce the size up to the object image 40 at the equal magnification, so that the third reduction display control is omitted. Further, in the case where the representative point Pr and the focus position Pf are located at the center point (origin O) of the display area 161a in a case where the object image 40 at the equal magnification is displayed in the display area 161a, the first reduction display control can reduce the size up to the object image 40 at the equal magnification, so that the second reduction display control and the third reduction display control are omitted. Further, FIGS. 16 and 17 illustrate the case where the reduction display control is started after the third enlargement display control is terminated, but the present embodiment is not limited to the examples. In a case where the reduction button 172b is operated in the middle of the first enlargement display control, the third reduction display control may be started. In a case where the reduction button 172b is operated in the middle of the second enlargement display control, the second reduction display control may be started. In a case where the reduction button 172b is operated in the middle of the third enlargement display control, the first reduction display control may be started.

Next, a control procedure of reduction display processing for performing the first to third reduction display controls will be described.

Figure 18:
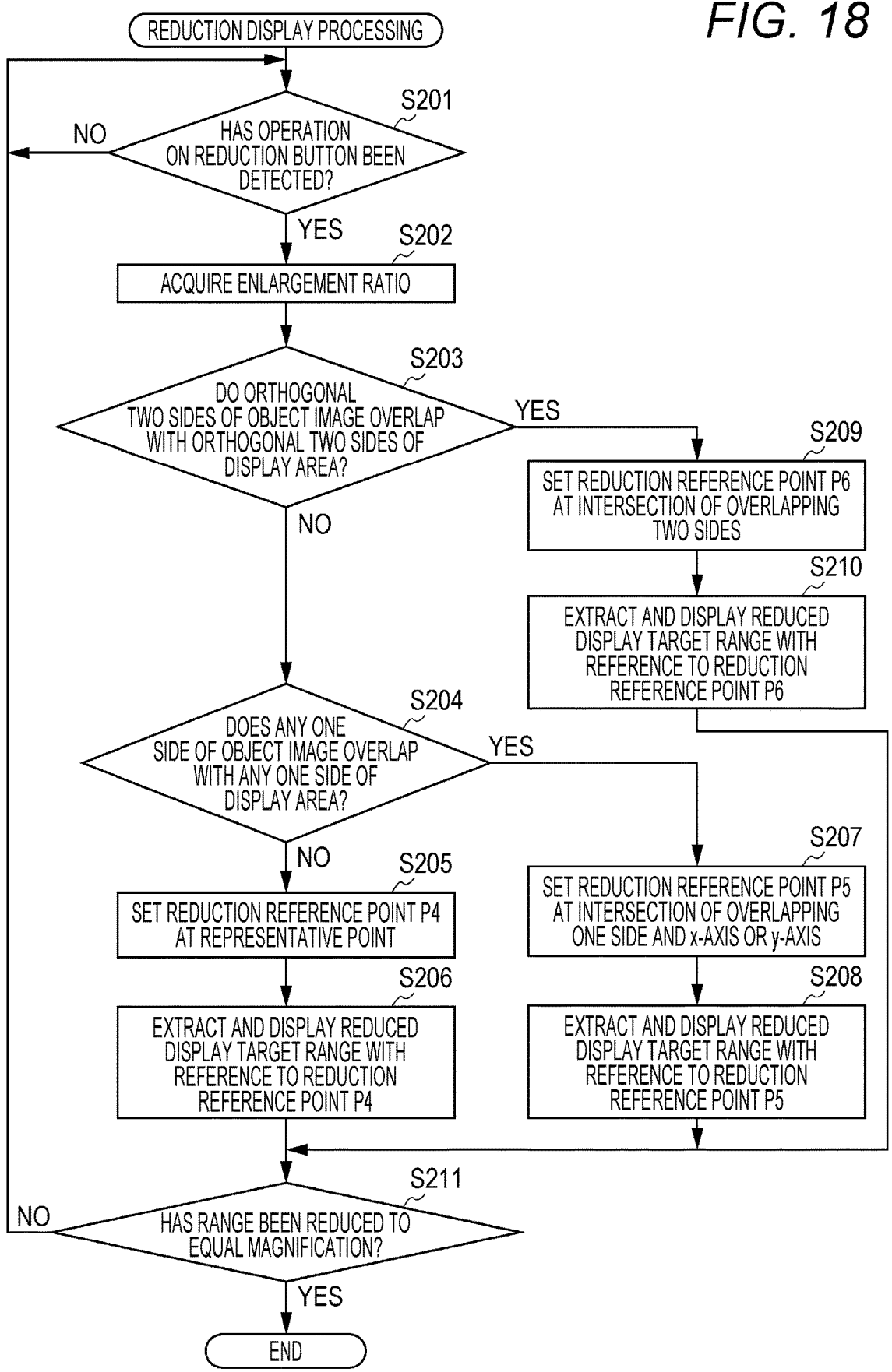
FIG. 18 is a flowchart illustrating a control procedure of reduction display processing.

FIG. 18 is a flowchart illustrating a control procedure by the CPU 11 of the reduction display processing.

In a case where the reduction display control is started, the CPU 11 receives a user operation instructing the start of the first reduction display control. That is, the CPU 11 determines whether the operation on the reduction button 172b has been detected (step S201), and in the case where it is determined that the operation has not been detected ("NO" in step S201), step S201 is executed again. In the case where it is determined that the operation has been detected ("YES" in step S201), the CPU 11 acquires the enlargement ratio corresponding to the operation (step S202). That is, the CPU 11 subtracts a predetermined decrease value (for example, 0.1) from the enlargement ratio before the execution of step S201 to obtain the enlargement ratio according to the above operation. The CPU 11 determines whether two orthogonal sides of the object image 40 overlap with two orthogonal sides of the display area 161a (step S203). In the case where it is determined that the two orthogonal sides of the object image 40 do not overlap with the two orthogonal sides of the display area 161a ("NO" in step S203), the CPU 11 determines whether any one side of the object image 40 overlaps with any one side of the display area 161a (step S204).

In a case where it is determined that any one side of the object image 40 does not overlap any one side of the display area 161a ("NO" in step S204), the CPU 11 sets the reduction reference point P4 at the representative point Pr of the object image 40 (step S205). The CPU 11 extracts the reduced display target range with reference to the reduction reference point P4 and displays the extracted display target range in the display area 161a (step S206). Further, the CPU 11 resets the focus position Pf at the display position of the representative point Pr in the reduced display target range, of the display area 161a, and displays the focus mark 161c. Here, in a case where one side of the display target range and one side of the edge portion of the object image 40 do not overlap with each other due to the relationship between the position of the representative point Pr and the display magnification although the display magnification is reduced to a display magnification at which one side of the display target range and one side of the edge portion of the object image 40 can overlap with each other, the CPU 11 finely adjusts the display magnification such that the sides overlap with each other or performs adjustment to shift the extraction range of the display target range in the x direction and/or the y direction.

In the case where it is determined that any one side of the object image 40 overlaps with any one side of the display area 161a ("YES" in step S204), the CPU 11 sets the reduction reference point P5 at the intersection of the overlapping one side of the object image 40 and the x-axis or the y-axis (step S207). The CPU 11 extracts the reduced display target range with reference to the reduction reference point P5 and displays the extracted display target range in the display area 161a (step S208). Further, the CPU 11 resets the focus position Pf at the display position of the representative point Pr in the reduced display target range 40b, of the display area 161a, and displays the focus mark 161c. Here, in a case where two sides of the display target range and two sides of the edge portion of the object image 40 do not overlap with each other due to the relationship between the position of the representative point Pr and the display magnification although the display magnification is reduced to a display magnification at which two sides of the display target range and two sides of the edge portion of the object image 40 can overlap with each other, the CPU 11 finely adjusts the display magnification such that the two sides overlap with each other or performs adjustment to shift the extraction range of the display target range in the x direction and/or the y direction.

In the case where it is determined that two orthogonal sides of the object image 40 overlap with two orthogonal sides of the display area 161a in step S203 ("YES" in step S203), the CPU 11 sets the reduction reference point P6 at the intersection of the two overlapping sides in the object image 40 (step S209). The CPU 11 extracts the reduced display target range with reference to the reduction reference point P6 and displays the extracted display target range in the display area 161a (step S210). Further, the CPU 11 resets the focus position Pf at the display position of the representative point Pr in the reduced display target range, of the display area 161a, and displays the focus mark 161c.

In a case where step S206, S208, or S210 ends, the CPU 11 determines whether the display target range has been reduced to the equal size (step S211). In the case where it is determined that the display target range has not been reduced to the equal size ("NO" in step S211), the CPU 11 returns the processing to step S201 and receives the next operation on the reduction button 172b. In the case where it is determined that the display target range has been reduced to the equal size ("YES" in step S211), the CPU 11 terminates the reduction display processing.

In the reduction display processing, steps S205 and S206 correspond to the first reduction display control, steps S207 and S208 correspond to the second reduction display control, and steps S209 and S210 correspond to the third reduction display control.

Note that the reduction display control is not limited to the control following the above algorithm. For example, the enlarged display target ranges 40a to 40c extracted in the enlargement display control may be stored in the storage unit 13, and every time the reduction button 172b is operated, the display target ranges 40c to 40a may be displayed in the order opposite to the display order in the enlargement display control, that is, in the order in which the display magnification decreases.

<Modification 1>

Next, modification 1 of the above-described embodiment will be described. The processing for performing enlargement display and reduction display of the object image 40 is not limited to the processing illustrated in the above embodiment, and may be, for example, processing illustrated in the present modification.

Figure 19:
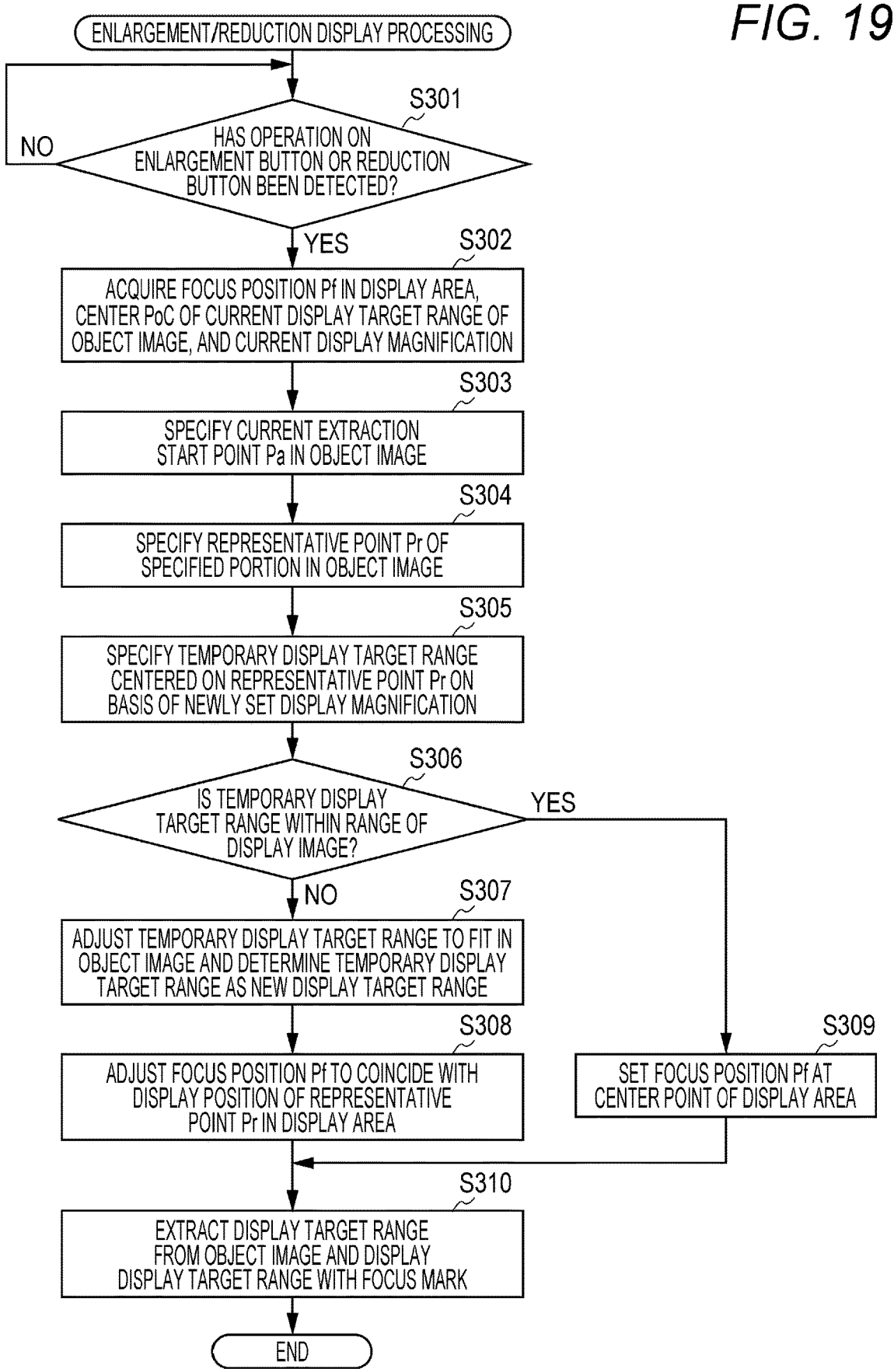
FIG. 19 is a flowchart illustrating a control procedure of enlargement/reduction display processing according to modification 1.

FIG. 19 is a flowchart illustrating a control procedure by the CPU 11 of enlargement/reduction display processing according to the modification 1.

The enlargement/reduction display processing is started in a state where the focus position Pf is set at the position where the representative point Pr of the specified portion 30 is displayed in the display area 161a.

In a case where the enlargement/reduction display processing is started, the CPU 11 determines whether an operation on the enlargement button 172a or the reduction button 172b has been detected (step S301), and in a case where it is determined that the operation has not been detected ("NO" in step S301), step S301 is executed again. In a case where it is determined that the operation has been detected ("YES" in step S301), the CPU 11 acquires the focus position Pf in the display area 161a, a center Poc of current display target range of the object image 40, and a current display magnification (step S302). Next, the CPU 11 specifies a current extraction start position Pa in the object image 40 on the basis of the information acquired in step S302 (step S303), and specifies the representative point Pr of the specified portion 30 in the object image 40 (step S304).

Figure 20:
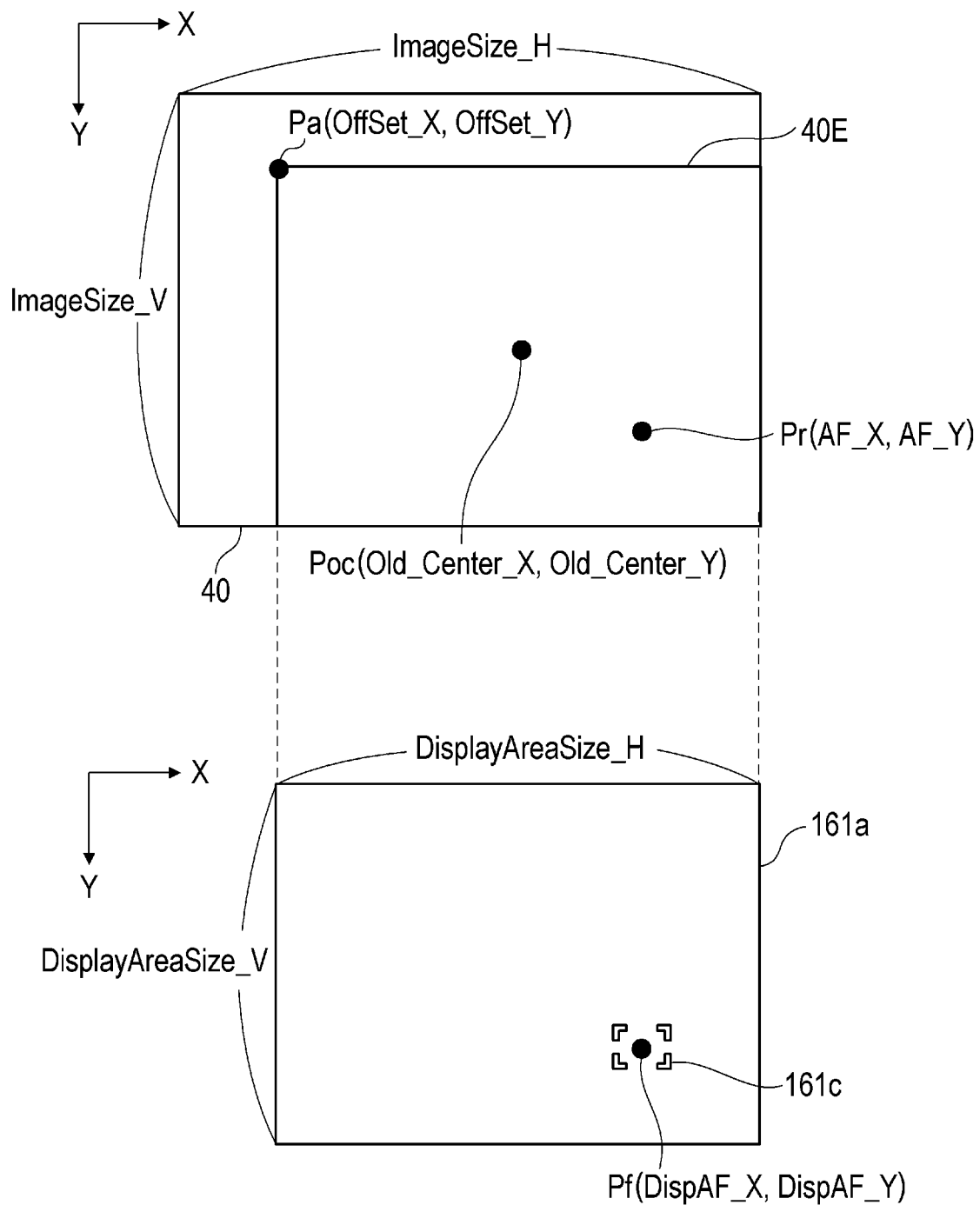
FIG. 20 is a diagram for describing a focus position, a center, an extraction start position, and a representative point.

FIG. 20 is a diagram for describing the focus position Pf, the center Poc, the extraction start position Pa, and the representative point Pr.

The upper diagram in FIG. 20 illustrates image data of the object image 40, and the lower diagram illustrates the display area 161a of the display unit 16.

The coordinates on the object image 40 are represented in an XY coordinate system with an upper left corner of the object image 40 as an origin. The number of pixels in the X direction of the object image 40 is set to "ImageSize_H", and the number of pixels in the Y direction is set to "ImageSize_V". It is assumed that the X coordinate in the object image 40 starts from "1", and the X coordinate of a pixel located at the end on the +X direction side of the object image 40 is "ImageSize_H". It is assumed that the Y coordinate in the object image 40 starts from "1", and the Y coordinate of the pixel located at the end on the +Y direction side of the object image 40 is "ImageSize_V".

Further, coordinates on the display area 161a are represented in an XY coordinate system with an upper left corner of the display area 161a as an origin. The number of pixels in the X direction of the display area 161a is set to "DisplayAreaSizeSize_H", and the number of pixels in the Y direction is set to "DisplayAreaSize_V". It is assumed that the X coordinate in the display area 161a starts from "1", and the X coordinate of the pixel located at the end on the +X direction side of the display area 161a is "DisplayAreaSize_H". It is assumed that the Y coordinate in the display area 161a starts from "1", and the Y coordinate of the pixel located at the end on the +Y direction side of the display area 161a is "DisplayAreaSize_V". In a case where the number of pixels in the display area 161a is larger than the number of pixels in the enlarged display target range of the object image 40, interpolation processing may be performed for the display target range of the object image 40.

As illustrated in the lower diagram of FIG. 20, here, it is assumed that the focus position Pf (DispAF_X, DispAF_Y) is set in the display area 161a in response to a touch operation of the user. Further, as illustrated in the upper diagram of FIG. 20, the center of the current enlarged display target range 40E in the object image 40 is the center Poc (Old_Center_X, Old_Center_Y). The coordinates of the center Poc are stored in the storage unit 13 in the processing of displaying the display target range 40E. In step S302 of FIG. 19, the coordinates of the focus position Pf and the center Poc, and a current display magnification value (hereinafter referred to as "Now_Zoom") are acquired.

In step S303, the current extraction start position Pa (OffSet_X, OffSet_Y) in the object image 40 is specified by the following equation. The extraction start position Pa is coordinates of the upper left corner of the current display target range 40E.

OffSet_X=Old_Center_X−(ImageSize_H/Now_Zoom)/2

OffSet_Y=Old_Center_Y−(ImageSize_V/Now_Zoom)/2

In step S304, the representative point Pr (AF_X, AF_Y) of the specified portion in the object image 40 is specified by the following equations.

AF_X=OffSet_X+(DispAF_X/DisplayAreaSize_H)·ImageSize_H/Now_Zoom

AF_Y=OffSet_Y+(DispAF_Y/DisplayAreaSize_V)·ImageSize_V/Now_Zoom

Returning to FIG. 19, the CPU 11 specifies a temporary display target range 40T in which the representative point Pr is located in the middle (for example, the center) on the basis of a display magnification value (hereinafter referred to as "Next_Zoom") newly set according to the operation on the enlargement button 172a or the reduction button 172b (step S305).

Figure 21:
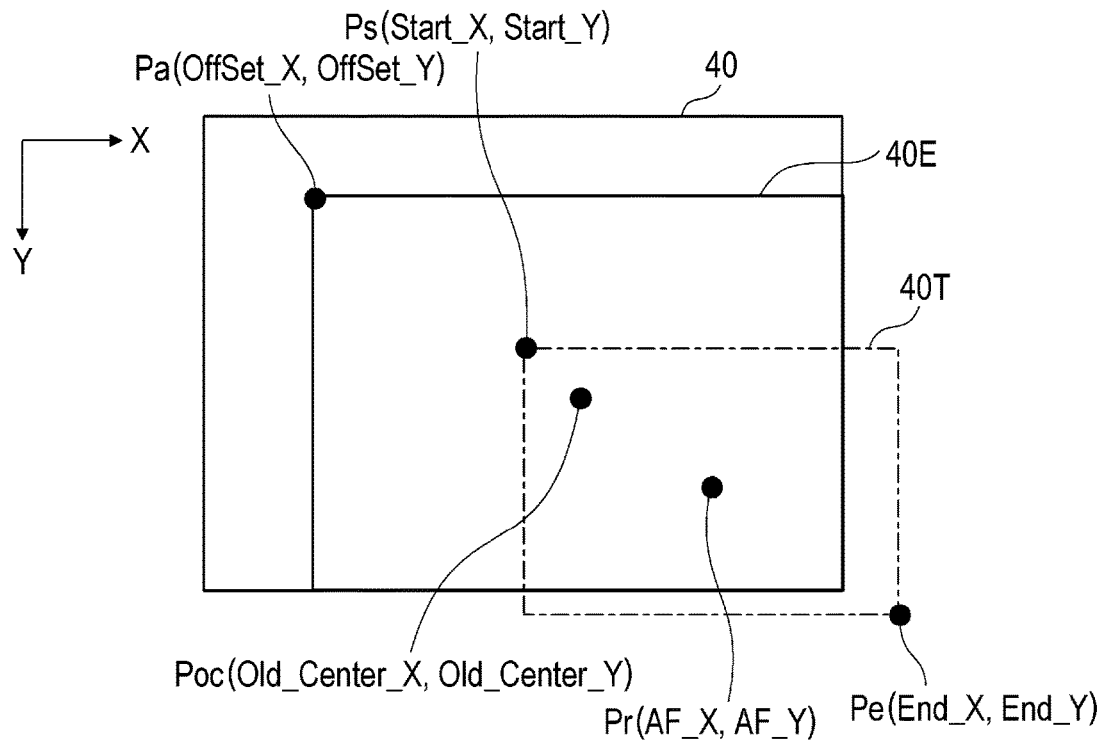
FIG. 21 is a diagram illustrating an example of a temporary display target range.

FIG. 21 is a diagram illustrating an example of the temporary display target range 40T.

The temporary display target range 40T is represented by an extraction start position Ps (Start_X, StartY) and an extraction end position Pe (End_X, End_Y). In step S305, the extraction start position Ps and the extraction end position Pe are specified by the following equations.

Start_X=AF_X−ImageSize_H·NextZoom/2

Start_Y=AF_Y−ImageSize_V·NextZoom/2

End_X=AF_X+ImageSize_H·NextZoom/2

End_Y=AF_Y+ImageSize_V·NextZoom/2

As illustrated in FIG. 21, the temporary display target range 40T may include a portion outside the range of the object image 40 depending on the position of representative point Pr and the display magnification. Therefore, in step S306 of FIG. 19, the CPU 11 determines whether the temporary display target range 40T fits within the range of the object image 40.

In a case where it is determined that the temporary display target range 40T does not fit within the range of the object image 40 ("NO" in step S306), the CPU 11 adjusts the position of the temporary display target range 40T so as to fit within the object image 40, and confirms the temporary display target range as a new display target range 40F (step S307). Specifically, in step S307, the coordinates of the extraction start position Ps and the extraction end position Pe are adjusted according to the following (1) to (4).

(1) Case of Start_X<1

In this case, temporary display target range 40T protrudes leftward from the left end of the object image 40.

Therefore, the following adjustment is performed so that the left end of the temporary display target range 40T is aligned with the left end of the object image 40.

Start_X=1

End_X=1+ImageSize_H/NextZoom (2) Case of End_X>ImageSize_H

In this case, the temporary display target range 40T protrudes rightward from the right end of the object image 40.

Therefore, the following adjustment is performed so that the right end of the temporary display target range 40T is aligned with the right end of the object image 40.

End_X=ImageSize_H

Start_X=End_X−ImageSize_H/NextZoom (3) Case of Start_Y<1

In this case, the temporary display target range 40T protrudes upward from the upper end of the object image 40. Therefore, the following adjustment is performed so that the upper end of the temporary display target range 40T is aligned with the upper end of the object image 40.

Start_Y=1

End_Y=1+ImageSize_V/NextZoom (4) Case of End_Y>ImageSize_V

In this case, the temporary display target range 40T protrudes downward from the lower end of the object image 40. Therefore, the following adjustment is performed so that the lower end of the temporary display target range 40T is aligned with the lower end of the object image 40.

End_Y=ImageSize_V

Start_Y=End_Y−ImageSize_V/NextZoom

Figure 22:
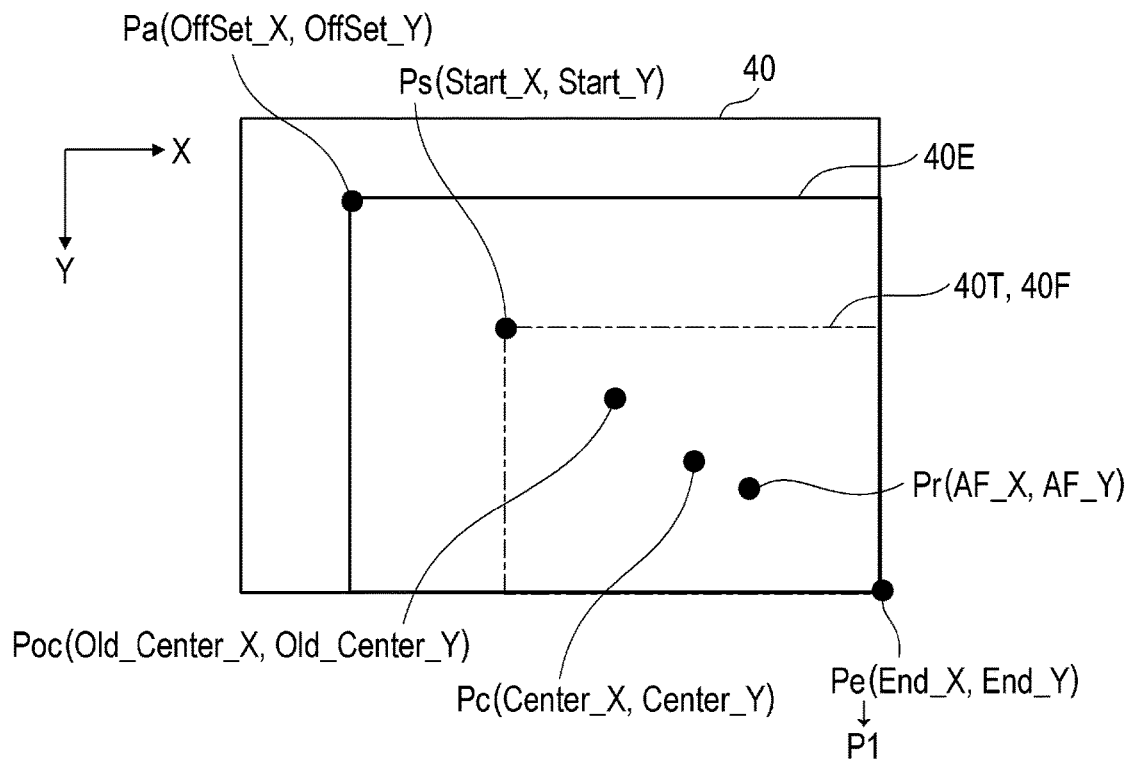
FIG. 22 is a diagram illustrating a state in which position adjustment is performed on the temporary display target range in FIG. 21.

FIG. 22 is a diagram illustrating a state in which position adjustment is performed for the temporary display target range 40T in FIG. 21.

Since the temporary display target range 40T in FIG. 21 protrudes to the right side and the lower side with respect to the object image 40, the adjustment of (2) and (4) is performed in step S307. As a result, as illustrated in FIG. 22, the right end and the lower end of the temporary display target range 40T are adjusted to be aligned with the right end and the lower end of the object image 40. Further, the center Pc (Center_X, Center_Y) of the adjusted temporary display target range 40T (display target range 40F) is specified by the following equations.

Center_X=Start_X+ImageSize_H/Next_Zoom/2

Center_Y=Start_Y+ImageSize_V/Next_Zoom/2

The coordinates of the specified center Pc are referred to as the coordinates of the center Poc in the next enlargement/reduction display processing. That is, the following substitution processing is performed.

Old_Center_X←Center_X

Old_Center_Y←Center_Y

Returning to FIG. 19, the CPU 11 adjusts the focus position Pf (DispAF_X, DispAF_Y) to coincide with the display position of the representative point Pr in the display area 161a (step S308). This adjustment is performed according to the following equations.

DispAF_X=((AF_X−Start_X)/ImageSize_H)·DisplayAreaSize_H·Next_Zoom

DispAF_Y=((AF_Y−Start_Y)/ImageSize_V)·DisplayAreaSize_V·Next_Zoom

Next, the CPU 11 extracts a new display target range 40F (the temporary display target range 40T adjusted in step S307) from the object image 40, and displays the display target range together with the focus mark 161c in the display area 161a (step S310). As described above, the processing in steps S305 to S308 and S310 corresponds to enlargement display control for adjusting the position of the temporary display target range 40T so as to be within the range of the object image 40 and extracting the adjusted temporary display target range 40T as the display target range F in the case where the temporary display target range 40T includes a portion outside the range of the object image 40.

Figure 23:
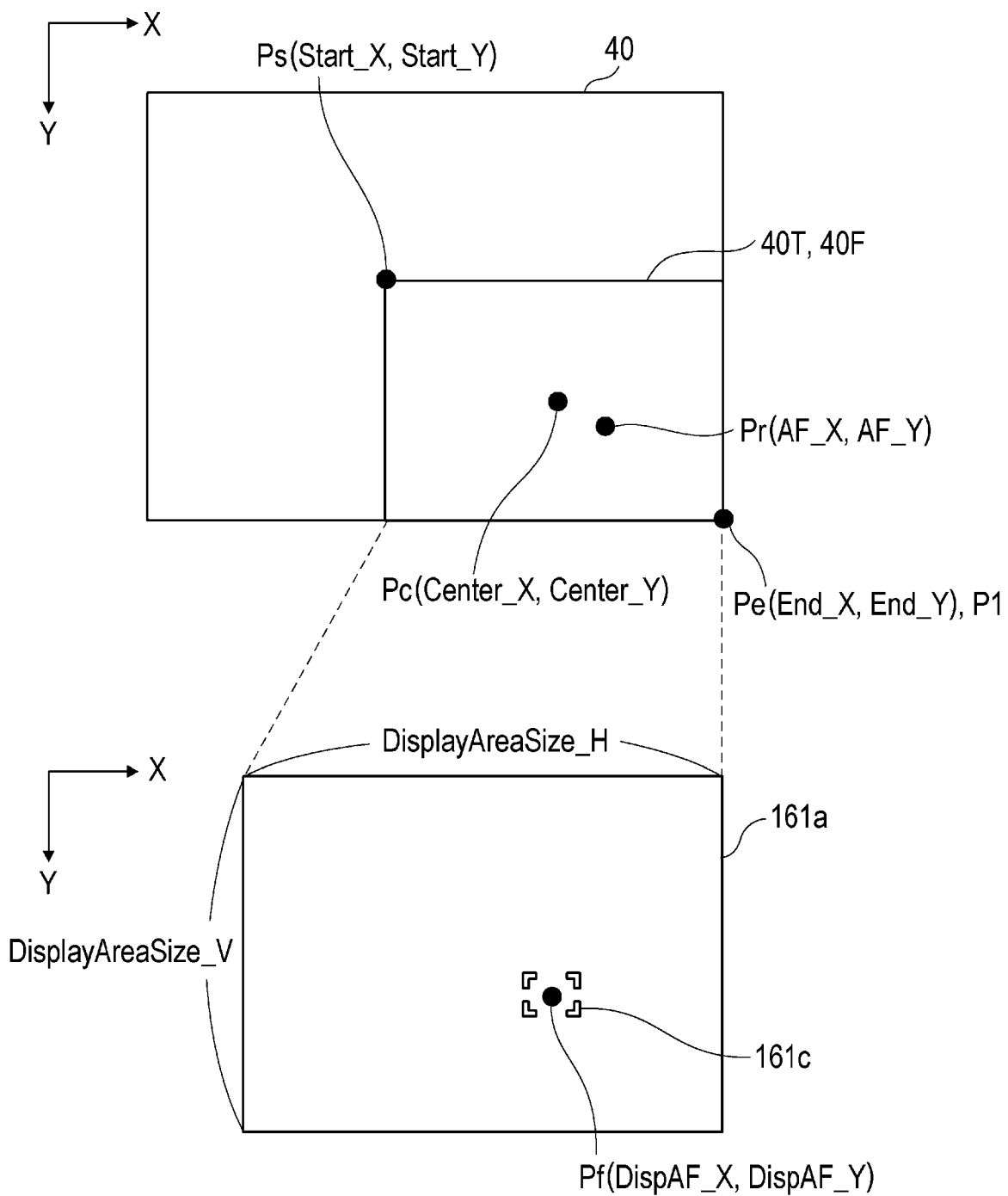
FIG. 23 is a diagram illustrating a relationship between a display state and an object image in step S310.

FIG. 23 is a diagram illustrating a relationship between a display state and the object image 40 in step S310.

As illustrated in the lower diagram of FIG. 23, the display target range 40F specified by the extraction start position Ps and the extraction end position Pe in the object image 40 is enlarged and displayed in the display area 161a. Further, in the display, the focus position Pf is set at the display position of the representative point Pr, and the focus mark 161c is displayed.

As illustrated in FIG. 21, in the case where the temporary display target range includes a portion outside the range of object image 40, the operation of adjusting the position of the temporary display target range 40T to determine the enlarged display target range 40F corresponds to the operation of setting the enlargement reference point (enlargement reference portion) in a portion overlapping with the temporary display target range 40T, of the edge portion of object image 40, and performing enlargement with reference to the enlargement reference point P1. In the case where the portion overlapping with the temporary display target range 40T, of the edge portion of the object image 40, includes a corner of the object image 40, the operation corresponds to the operation of setting the enlargement reference point P1 at the corner and performing enlargement. More specifically, in (1) or (2) in step S307 described above, the processing of adjusting Start_X or End_X corresponds to the processing of determining an X coordinate of the enlargement reference point P1, and in (3) or (4), the processing of adjusting Start_Y or End_Y corresponds to the processing of determining a Y coordinate of the enlargement reference point P1. The enlargement from the current display target range 40E illustrated in FIG. 22 to the new display target range 40F corresponds to the processing of extracting the enlarged display target range so as to include the enlargement reference point P1 and the representative point Pr.

Figure 24A:
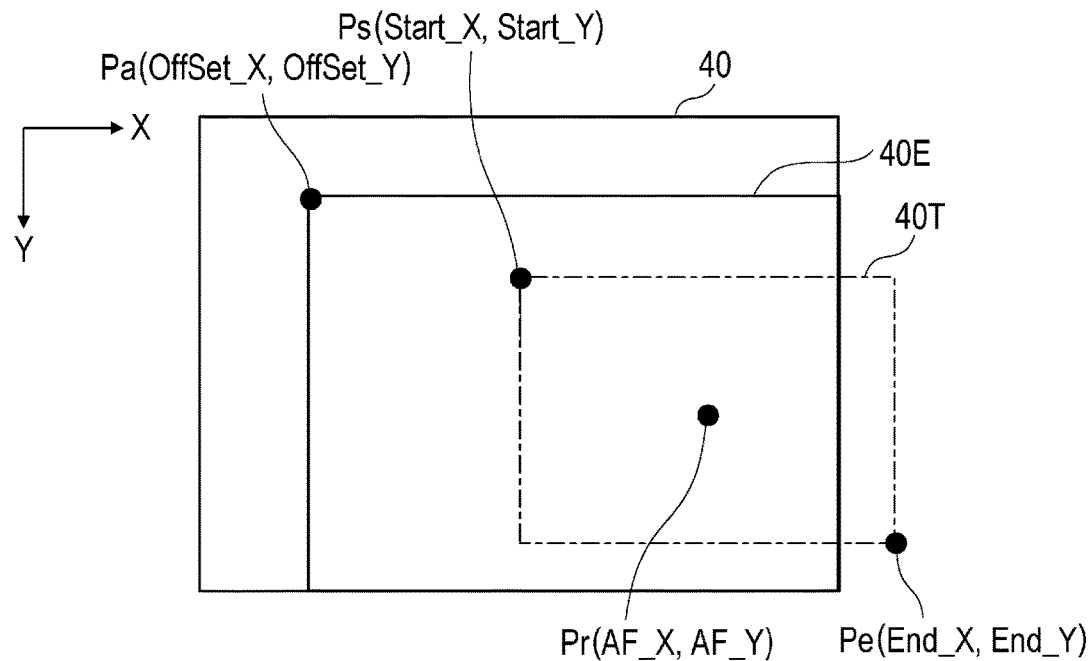
FIGS. 24A and 24B are diagrams illustrating another example of a position of the temporary display target range.
Figure 24B:
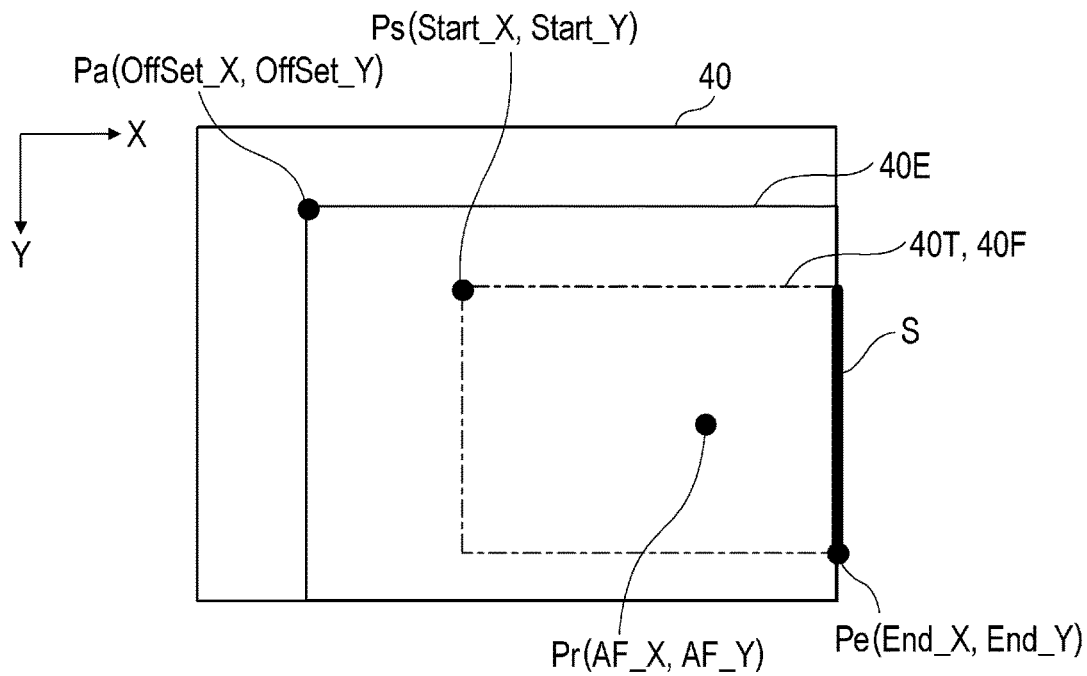

Meanwhile, for example, as illustrated in FIG. 24A, in a case where the temporary display target range 40T protrudes from only one side of the edge portion of the object image 40, only the adjustment of (1) or (2) or only the adjustment of (3) or (4) is performed in step S307 (in the example of FIGS. 24A and 24B, only the adjustment of (2) is performed). As a result, as illustrated in FIG. 24B, one side (here, the right side S) of the temporary display target range 40T is adjusted to be aligned with one side of the edge portion of the object image 40. In this case, each point included in the side (right side S) overlapping with the edge portion of the object image 40, of the adjusted temporary display target range 40T, corresponds to the enlargement reference point. The enlargement from the current display target range 40E illustrated in FIG. 24B to the new display target range 40F corresponds to the processing of extracting the enlarged display target range so as to include the enlargement reference point located on the right side S and the representative point Pr. In other words, the right side S of the adjusted temporary display target range 40T corresponds to the enlargement reference portion. The enlargement from the current display target range 40E illustrated in FIG. 24B to the new display target range 40F corresponds to the processing of extracting the enlarged display target range so as to include the right side S as the enlargement reference portion and the representative point Pr.

On the other hand, in step S306 of FIG. 19, in the case where it is determined that the temporary display target range 40T falls within the range of the object image 40 ("YES" in step S306), the CPU 11 sets the focus position Pf at the center point of the display area 161a (step S309). Further, the CPU 11 extracts the temporary display target range 40T specified in step S305 as it is as the new display target range 40F, and displays the range in the display area 161a together with the focus mark 161c (step S310). As described above, the processing in steps S305, S306, S309, and S310 corresponds to the enlargement display control for extracting the temporary display target range 40T as the display target range F in the case where the temporary display target range 40T is within the range of the object image 40. In a case where the processing of step S310 ends, the CPU 11 terminates the enlargement/reduction display processing.

<Modification 2>

Next, a modification 2 of the above embodiment will be described. The modification 2 may be combined with the modification 1.

Figure 25:
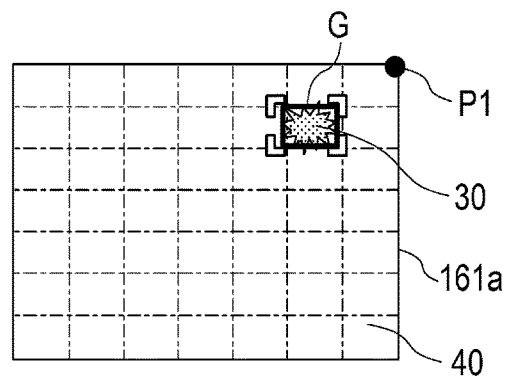
FIG. 25 is a diagram for describing an enlargement display operation of an object image according to modification 2.
Figure 25:
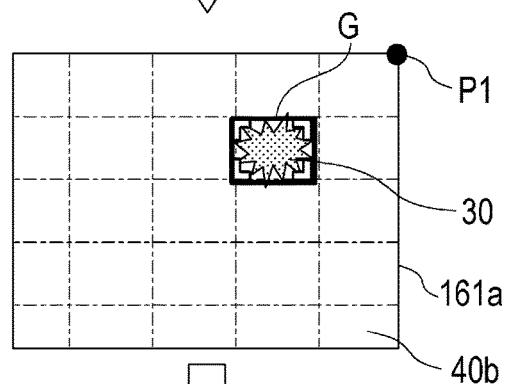
Figure 25:
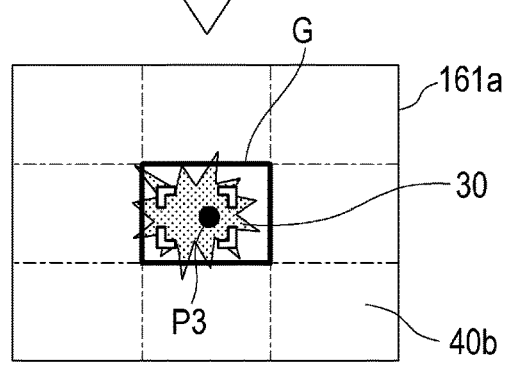
Figure 25:
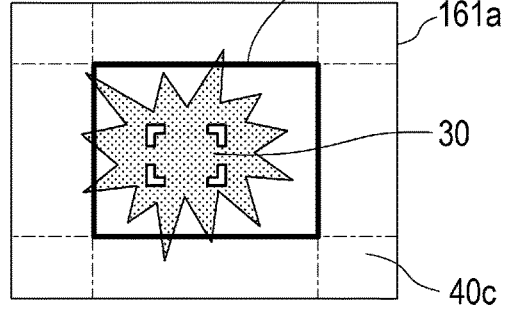

FIG. 25 is a diagram for describing an enlargement display operation of the object image 40 according to modification 2.

As illustrated in A of FIG. 25, in the modification 2, grids G arranged in a matrix are set in the display area 161a. Boundary lines of the grids in FIG. 25 are for convenience of description and are not displayed in the actual display area 161a. In a case where the user performs a touch operation to specify the specified portion 30, one grid G closest to a touch position is specified.

In each of the grids G, a display mode of a grid group in the display area 161a in a case where an arbitrary display magnification is specified is set in advance. For example, the grid G second from the right and second from the top illustrated in A of FIG. 25 is associated in advance with settings such that display is performed in the display mode of the grid group illustrated in B, C, or D of FIG. 25 as the display magnification increases. Specifically, in a case where a certain display magnification is specified, a grid group of 4.5 grids in length×4.5 grids in width from the upper end and the right end is set to be displayed, as illustrated in B of FIG. 25. Further, in a case where a certain display magnification is specified, a grid group of 3 grids in length×3 grids in width from the upper end and the right end is set to be displayed in a matrix, as illustrated in C of FIG. 25. In this state, since the grid G is displayed in the middle of the display area 161a, enlarged display centered on the center point (origin O) of the display area 161a is performed thereafter as illustrated in D of FIG. 25. At the time of reduction, the display may be shifted in the reverse order at the time of enlargement. Such an enlargement display operation and a reduction display operation also correspond to an operation of enlarging and displaying the object image 40 with reference to the enlargement reference points P1 to P3 and an operation of reducing and displaying the object image 40 with reference to the reduction reference points P4 to P6.

As described above, in the present modification, since the display mode at the time of enlargement/reduction is set in advance for each grid, it is possible to perform enlargement display and reduction display by simple processing as compared with the above-described embodiment in which the display target range is calculated each time on the basis of the representative point Pr.

<Modification 3>

Next, modification 3 of the above-described embodiment will be described. The modification 3 may be combined with the modification 1 and/or the modification 2.

In the above embodiment, the rectangular display area 161a has been exemplified, but the shape of the display area 161a is not limited to a rectangle. For example, the shape may be a polygon such as a triangle illustrated in FIG. 26A or an octagon illustrated in FIG. 26B, or may be a circle, an ellipse, or the like illustrated in FIG. 26C. In these cases, in a case where the object image 40 at the equal magnification is displayed in the display area 161a, a portion corresponding to the outer periphery of the display area 161a corresponds to the edge portion of the object image 40. In a case where the display target range in which the representative point Pr is located in the middle (for example, center) cannot be extracted with the acquired enlargement ratio, it is possible to perform the enlargement display in which the representative point Pr of the specified portion 30 is not partly cut off, similarly to the above-described embodiment, by performing the enlargement display control of setting the enlargement reference point on the edge portion. The first range R1 in the present modification is a range similar in shape to the edge portion (the outer periphery of the display area 161a) of the object image 40, and is determined such that the middle of the display target range in the case of assuming that the display target range is extracted from the object image 40 according to the acquired enlargement ratio and such that the representative point Pr of the specified portion 30 is located in the middle of the display target range is located within the first range R1.

Figure 26A:
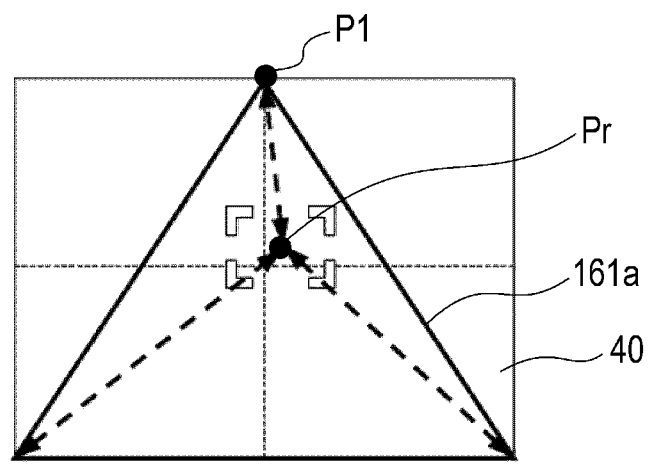
FIGS. 26A to 26C are diagrams illustrating examples of display areas of various shapes according to modification 3.
Figure 26B:
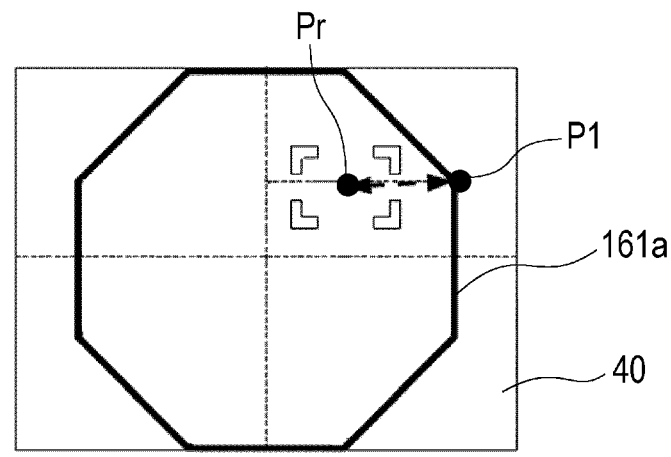
Figure 26C:
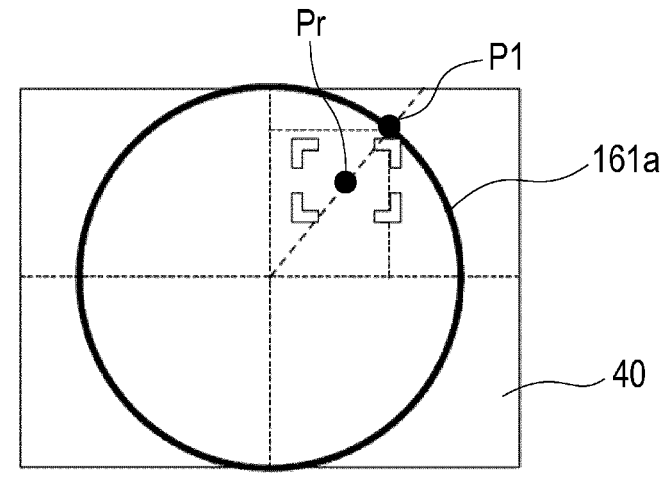

For example, in the case of the polygonal display area 161a illustrated in FIGS. 26A and 26B, in a case where the representative point Pr of the specified portion 30 is within a range excluding the first range R1, the enlargement display control may be executed by setting the enlargement reference point P1 to a point corresponding to a corner closest from the representative point Pr of the specified portion 30 in the polygon. Further, the enlargement display control may be performed by setting the enlargement reference point P1 to a point located on any point on the edge portion of the object image 40 and having the shortest distance from the representative point Pr. Further, in the case of the circular display area 161a illustrated in FIG. 26C, the enlargement display control may be executed by setting the enlargement reference point P1 at an intersection (that is, a point located at any point on the edge portion of the object image 40 and having the shortest distance from the representative point Pr) of the circle and a line segment extending from the middle (for example, the center point: the origin O of the display target range) of the display area 161a toward the representative point Pr. The enlargement reference point P1 can be set by a similar method even in the case of another figure without a corner, for example, an elliptical shape. In the case where the representative point Pr and the focus position Pf reach the origin O by the above-described enlargement display control, the third enlargement display control using the representative point Pr as the enlargement reference point may be executed thereafter.

<Modification 4>

Next, modification 4 of the above-described embodiment will be described. The modification 4 may be combined with any one or all of the modifications 1 to 3.

Figure 27:
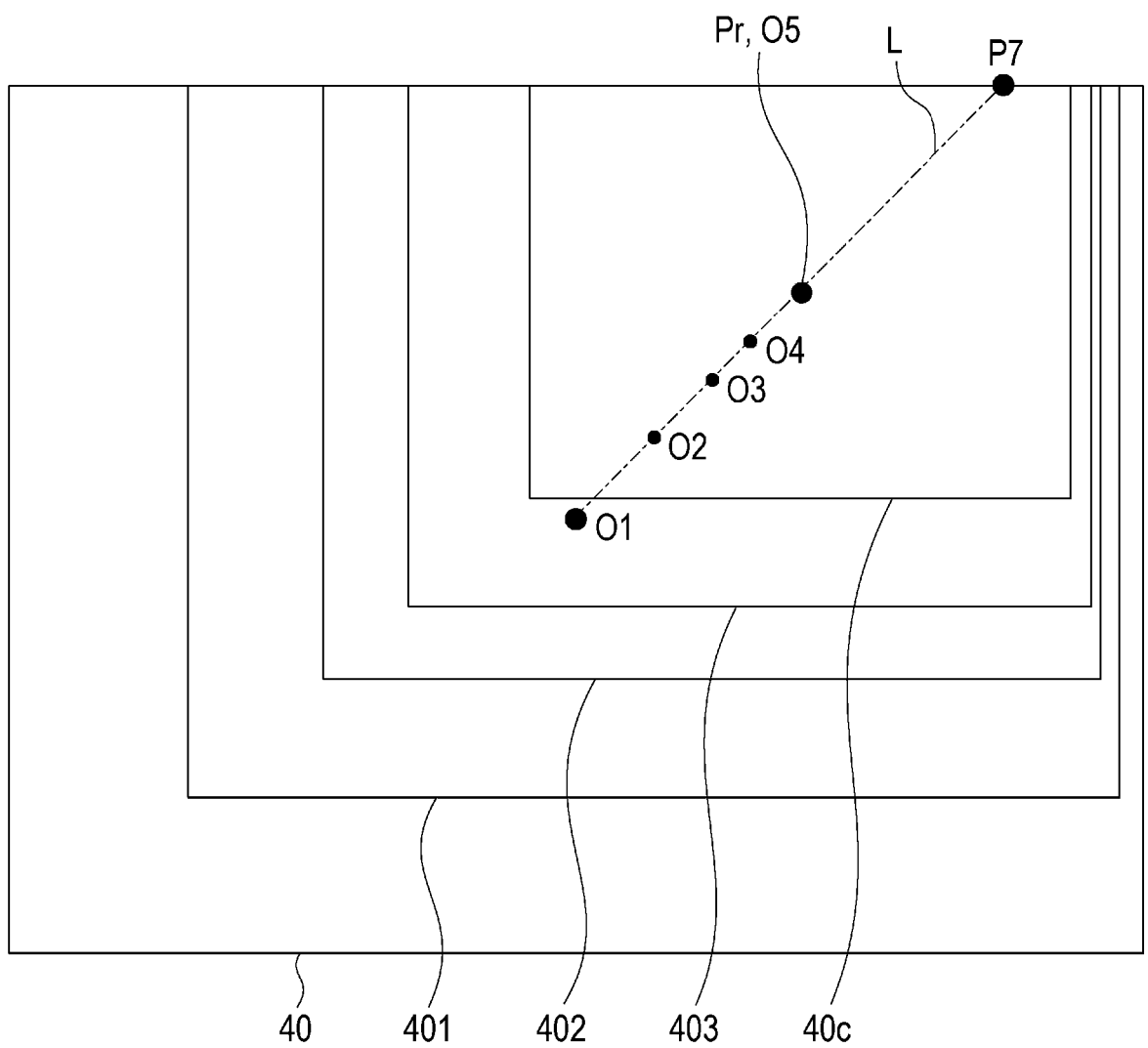
FIG. 27 is a diagram illustrating another example of the enlargement display control.

The above embodiment has the display mode in which the representative point Pr of the specified portion 30 moves to the center point (the origin O of the display target range) of the display area 161a by performing the second enlargement display control with reference to the enlargement reference point P2 after performing the first enlargement display control with reference to the enlargement reference point P1. However, the display mode is not intended to be limited to such two-stage display. For example, as illustrated in FIG. 27, an enlargement reference point P7 (enlargement reference portion) may be determined at an intersection of a line segment L extending from the middle (here, the center O1) of the object image 40 to the edge portion of the object image 40 through the representative point Pr of the specified portion 30 and the edge portion of the object image 40, and enlargement may be performed with reference to the enlargement reference point P7. Points O2 to O4 in FIG. 27 indicate the origin of intermediate display target ranges 401 to 403 in a case where the object image 40 is enlarged to the display target range 40c with reference to the enlargement reference point P7. The representative point Pr is located on a line segment connecting the origin O2 to O4 and the enlargement reference point P7 in each of the display target ranges 401 to 403, and the representative point Pr is located at an origin O5 in the display target range 40c. Therefore, by enlarging the image with reference to the enlargement reference point P7, it is possible to perform enlargement display such that the representative point Pr linearly approaches the center point of the display area 161a with an increase in the display magnification.

<Effects>

As described above, the imaging device 1 according to the present embodiment includes the CPU 11 as at least one processor that controls the display operation of the display unit 16. The CPU 11 acquires the specified portion 30 specified by a first user operation in the object image 40 including the object 3 to be imaged, performs enlargement display control of enlarging a part of the object image 40 and displaying the enlarged part in the display area 161a of the display unit 16 in response to a second user operation, and sets the enlargement reference point as the enlargement reference portion in the object image 40 according to the specified portion 30 in the enlargement display control.

According to this configuration, the user can display the enlarged image including the desired specified portion 30 by the simple operation of specifying the specified portion 30 and instructing enlargement. Further, since the enlargement reference portion is set according to the specified portion 30, the range including the specified portion 30 can be appropriately extracted from the object image 40 and enlarged and displayed. Therefore, the desired portion of the object image 40 can be more easily and appropriately enlarged and displayed than a conventional technique in which the user specifies the display target range itself. For example, in a case where imaging is performed through the barrel 2 while performing illumination by the light emitting unit 15 as illustrated in FIGS. 2A and 2B, even if the desired specified portion 30 is located at a position deviated from the middle of the object image 40, the specified portion 30 can be enlarged and displayed for observation while maintaining the illumination state without moving the imaging device 1. Further, since the display can be enlarged in stages, a display state desired by the user can be easily obtained.

Further, the CPU 11 extracts the display target range from the object image 40 so as to include the enlargement reference portion and the specified portion 30, and enlarges and displays the extracted display target range in the display area 161a in the enlargement display control.

According to this configuration, since the enlarged display target range is automatically extracted and displayed so as to include the specified portion 30 desired by the user, the desired portion of the object image 40 can be easily and appropriately enlarged and displayed.

Further, the CPU 11 acquires the enlargement ratio of the object image 40 in response to the second user operation, and sets the enlargement reference point as the enlargement reference portion to the edge portion of the object image 40 in the enlargement display control in the case where the display target range cannot be extracted from the object image 40 according to the enlargement ratio and such that the representative point Pr of the specified portion 30 is located in the middle (for example, the center) of the display target range 40. As a result, the display can be enlarged in such a mode in which the specified portion 30 is not partly cut off from the display area 161*a* and the representative point Pr approaches the middle (for example, the center point) of the display area 161*a*.

Further, in the modification 1, the CPU 11 acquires the enlargement ratio of the object image 40 in response to the second user operation, specifies the enlarged temporary display target range 40T in which the representative point Pr is located in the middle (for example, the center) on the basis of the representative point Pr of the specified portion 30 and the enlargement ratio, and sets the enlargement reference point as the enlargement reference portion in the portion overlapping with the temporary display target range 40T, of the edge portion of the object image 40, in the enlargement display control, in the case where the temporary display target range 40T includes a portion outside the range of the object image 40. Thereby, the display operation in which the enlarged display target range is automatically extracted so as to include the specified portion 30 desired by the user can be implemented.

Further, in the modification 1, in the case where the portion overlapping with the temporary display target range 40T in the edge portion of the object image 40 includes a corner of the object image 40, the CPU 11 sets the enlargement reference point at the corner. As a result, the display can be enlarged in such a mode in which the specified portion 30 is not partly cut off from the display area 161*a* and the representative point Pr approaches the middle of the display area 161*a*.

Further, the CPU 11 acquires the enlargement ratio of the object image in response to the second user operation, and determines whether the representative point Pr of the specified portion 30 is within the range excluding the first range R1 in the object image. The first range R1 is a range similar in shape to the object image 40, and the middle of the display target range in the case of assuming that the display target range is extracted from the object image 40 according to the acquired enlargement ratio and such that the representative point Pr of the specified portion 30 is located in the middle (for example, the center) of the display target range 40 is located within the first range R1. In the case of determining that the representative point Pr is within the range excluding the first range R1, the CPU 11 sets the enlargement reference point as the enlargement reference portion in the edge portion of the object image 40 in the enlargement display control. As a result, the enlargement reference point can be appropriately set and the display can be enlarged by the simple determination processing based on the positional relationship between the first range R1 and the representative point Pr.

Further, the object image 40 may be an image having a shape with corners, and the CPU 11 may set the corner closest to the representative point Pr, of the edge portion of the object image 40, as the enlargement reference portion, or set the point located on any part of the edge portion and having the shortest distance from the representative point Pr as the enlargement reference portion in the enlargement display control in the case of determining that the representative point Pr is within the range excluding the first range R1. As a result, in the case where the object image 40 is an arbitrary polygon including a rectangle, the display can be enlarged in such a mode in which the specified portion 30 is not partly cut off from the display area 161*a* and the representative point Pr approaches the middle of the display area 161*a*.

Further, in the case where the object image 40 is a rectangular image, the CPU 11 determines whether there is the representative point Pr of the specified portion 30 within the range (that is, within the fourth range R4) excluding the first range, the second range, and the third range in the object image. The first range R1 is a rectangular range similar in shape to the object image 40. The second range R2 is a rectangular range in which the width of the second range R2 in the x direction parallel to one side of the object image 40 is the same as that of the first range R1, and corresponds to each of one-side portion and the other side-portion of the first range R1 in the y direction, of the object image 40. The third range R3 is a rectangular range in which the width of the third range R3 in the y direction is the same as that of the first range R1, and corresponds to each of one-side portion and the other-side portion of the first range R1 in the x direction, of the object image 40. In the case of determining that the representative point Pr is within the range excluding the first range R1, the second range R2, and the third range R3, the CPU 11 sets the enlargement reference point P1 at the corner closest to the representative point Pr of the specified portion 30, of the edge portion of the object image 40, in the first enlargement display control. By performing enlargement with reference to the enlargement reference point P1, the display can be enlarged in such a mode in which the specified portion 30 is not partly cut off from the display area 161*a* and the representative point Pr approaches the middle of the display area 161*a*. Further, the enlargement reference point P1 can be set at an appropriate position by simple processing.

Further, in the case where the object image 40 is a rectangular image, the CPU 11 determines whether the representative point Pr of the specified portion 30 is within the second range R2 or the third range R3, of the object image 40. In the case of determining that the representative point Pr is within the second range R2, the CPU 11 sets the enlargement reference point P2 at a point located on either the upper side S1 or the lower side S3 parallel to the x direction of the object image 40 and having the shortest distance from the representative point Pr. In the case of determining that the representative point Pr is within the third range R3, the CPU 11 sets the enlargement reference point P2 at a point located on either the right side S2 or the left side S4 parallel to the y direction of the object image 40 and having the shortest distance from the representative point Pr. By performing enlargement with reference to the enlargement reference point P2, the display can be enlarged in such a mode in which the specified portion 30 is not partly cut off from the display area 161*a* and the representative point Pr approaches the middle of the display area 161*a* along the x-axis or the y-axis. Further, the enlargement reference point P2 can be set at an appropriate position by simple processing.

Further, in the case of determining that the representative point Pr is in the range excluding the first range R1, the CPU 11 may set the enlargement reference point at the intersection of the edge portion of the object image 40 and the line segment extending from the middle (for example, the center) of the object image 40 through the representative point Pr of the specified portion 30 to the edge portion of the object image 40 in the enlargement display control. As a result, in the case where the object image 40 is an arbitrary shape including a circle, the display can be enlarged in such a mode in which the specified portion 30 is not partly cut off from the display area 161a and the representative point Pr approaches the middle of the display area 161a.

Further, the CPU 11 acquires the enlargement ratio of the object image 40 in response to the second user operation, determines whether the representative point Pr of the specified portion 30 is within the first range R1 in the object image 40, and sets the enlargement reference point P3 at the representative point Pr and extracts the display target range in which the representative point Pr is located in the middle (for example, the center) from the object image 40 in the third enlargement display control in the case where it is determined that the representative point Pr is within the first range R1. As a result, the display can be enlarged while maintaining the display position of the specified portion 30 in the middle of the display area 161a.

Further, in the enlargement display control, the CPU 11 sets the enlargement reference point such that the distance between the representative point Pr of the enlarged specified portion 30 and the center point of the display area 161a becomes equal to or less than the distance between the representative point Pr before enlargement and the center point. As a result, since the object image 40 is enlarged in stages in the mode where the representative point Pr approaches the center point, the enlarged display state desired by the user is more easily obtained.

Further, the CPU 11 performs the reduction display control of reducing the object image 40 with reference to the reduction reference point as a predetermined reduction reference portion other than the center in the object image 40 and displaying the reduced object image in the display area 161a in response to the third user operation received after the start of the enlargement display control. As a result, the object image 40 enlarged by the enlargement display control can be reduced and displayed.

Further, in the case where the edge portion of the object image 40 does not overlap with any side of the outer periphery of the display area 161a, the CPU 11 sets the representative point Pr as the reduction reference point P4 in the reduction display control. As a result, the display can be reduced while maintaining the display position of the specified portion 30 in the middle of the display area 161a.

Further, in the case where a part of the edge portion of the object image 40 overlaps with any one side of the outer periphery of the display area 161a, the CPU 11 sets the intersection of the x-axis or the y-axis and the one side as the reduction reference point P5 in the reduction display control. Thereby, a portion outside the range of the object image 40 can be prevented from being displayed in the display area 161a after the reduction.

Further, in the case where two orthogonal sides of the edge portion of the object image 40 overlap with two orthogonal sides of the outer periphery of the display area 161a, the CPU 11 sets the intersection of the two sides of the edge portion of the object image 40 as the reduction reference point P6 in the reduction display control. Thereby, a portion outside the range of the object image 40 can be prevented from being displayed in the display area 161a after the reduction.

Further, the imaging device 1 according to the present embodiment includes the CPU 11 as at least one processor that controls the display operation of the display unit 16. The CPU 11 acquires the specified portion 30 specified by the first user operation in the object image 40 including the object 3 to be imaged (step S103 in FIG. 10 and step S304 in FIG. 19), acquires the enlargement ratio of the object image 40 in response to the second user operation (step S105 in FIG. 10 and step S305 in FIG. 19), performs the enlargement display control of extracting the display target range including the acquired specified portion 30 and having the size according to the acquired enlargement ratio from the object image 40 and displaying the display target range in the display area 161a of the display unit 16 (in the above embodiment, step S105 in FIG. 10 to step S119 in FIG. 11. In the modification 1, steps S305 to S310 in FIG. 19), and performs any of the plurality of enlargement display controls in which the display target ranges extracted from the object image 40 are different from each other according to the position of the acquired specified portion 30 and the acquired enlargement range (in the above embodiment, the enlargement display control in any one of steps S109 to S110 in FIG. 10, steps S111 to S113, steps S114 to S116, or steps S117 to S119 in FIG. 11. In the above modifications, the enlargement display control including steps S305 to S308 and S310, or the enlargement display control including steps S305, S306, and S309).

According to this configuration, since the range including the specified portion is appropriately extracted from the object image 40 and enlarged and displayed according to the specified portion 30 and the enlargement ratio, the user can appropriately enlarge and display the desired portion of the object image 40 by a simple operation of specifying the specified portion 30 and instructing enlargement.

Further, the CPU 11 specifies the enlarged temporary display target range 40T in which the representative point Pr of the specified portion 30 is located in the middle (for example, the center) on the basis of the representative point Pr and the acquired enlargement ratio, performs the enlargement display control of extracting the temporary display target range 40T as the display target range in the case where the temporary display target range 40T is within the range of the object image 40, and performs the enlargement display control of adjusting the position of the temporary display target range 40T so as to include the specified portion 30 and to be within the range of the object image 40, and extracting the adjusted temporary display target range 40T as the display target range in the case where the temporary display target range 40T includes a portion outside the range of the object image 40. Thereby, the display operation in which the enlarged display target range is automatically extracted so as to include the specified portion 30 desired by the user can be implemented.

Further, the program 131 according to the present embodiment causes the CPU 11 as a computer to implement, as functions for controlling the display operation of the display unit 16, a function to acquire the specified portion 30 specified by the first user operation in the object image 40 including the object 3 to be imaged, a function to perform the enlargement display control of enlarging a part of the object image 40 and displaying the enlarged part in the display area 161a of the display unit 16 in response to the second user operation, and a function to set the enlargement reference point as the enlargement reference portion in the object image 40 according to the specified portion 30 in the enlargement display control.

According to this configuration, the user can display the enlarged image including the desired specified portion 30 by the simple operation of specifying the specified portion 30 and instructing enlargement. Further, since the enlargement reference portion is set according to the specified portion 30, the range including the specified portion 30 can be appropriately extracted from the object image 40 and enlarged and displayed. Therefore, the desired portion of the object image 40 can be more easily and appropriately enlarged and displayed than a conventional technique in which the user specifies the display target range itself. Further, since the display can be enlarged in stages, a display state desired by the user can be easily obtained.

Further, the program 131 according to the present embodiment causes the CPU 11 as a computer to implement, as the functions to control the display operation of the display unit 16, the function to acquire the specified portion 30 specified by the first user operation in the object image 40 including the object 3 to be imaged (step S103 in FIG. 10 and step S304 in FIG. 19), acquires the enlargement ratio of the object image 40 in response to the second user operation (step S105 in FIG. 10 and step S305 in FIG. 19), the function to perform the enlargement display control of extracting the display target range including the acquired specified portion 30 and having the size according to the acquired enlargement ratio from the object image 40 and displaying the display target range in the display area 161*a* of the display unit 16 (in the above embodiment, step S105 in FIG. 10 to step S119 in FIG. 11. In the modification 1, steps S305 to S310 in FIG. 19), and the function of perform any of the plurality of enlargement display controls in which the display target ranges extracted from the object image 40 are different from each other according to the position of the acquired specified portion 30 and the acquired enlargement range (in the above embodiment, the enlargement display control in any one of steps S109 to S110 in FIG. 10, steps S111 to S113, steps S114 to S116, or steps S117 to S119 in FIG. 11. In the above modifications, the enlargement display control including steps S305 to S308 and S310, or the enlargement display control including steps S305, S306, and S309).

According to this configuration, since the range including the specified portion 30 is appropriately extracted from the object image 40 and enlarged and displayed according to the specified portion 30 and the enlargement ratio, the user can appropriately enlarge and display the desired portion of the object image 40 by a simple operation of specifying the specified portion 30 and instructing enlargement.

Further, a method of displaying an object image according to the present embodiment is a method of displaying the object image 40 including the object 3 to be imaged, and the method includes a first step of acquiring the specified portion 30 specified by the first user operation in the object image 40, and a second step of enlarging a part of the object image 40 and displaying the enlarged part of the object image in the display area 161*a* of the display unit 16 in response to the second user operation, and in a third step, the enlargement reference point as the enlargement reference portion is set in the object image 40 according to the specified portion 30.

According to this configuration, the user can display the enlarged image including the desired specified portion 30 by the simple operation of specifying the specified portion 30 and instructing enlargement. Further, since the enlargement reference portion is set according to the specified portion 30, the range including the specified portion 30 can be appropriately extracted from the object image 40 and enlarged and displayed. Therefore, the desired portion of the object image 40 can be more easily and appropriately enlarged and displayed than a conventional technique in which the user specifies the display target range itself. Further, since the display can be enlarged in stages, a display state desired by the user can be easily obtained.

Further, the method of displaying the object image according to the present embodiment is a method of displaying the object image 40 including the object 3 to be imaged, the method including the step of acquiring the specified portion 30 specified by the first user operation in the object image 40 (step S103 in FIG. 10 and step S304 in FIG. 19), acquires the enlargement ratio of the object image 40 in response to the second user operation (step S105 in FIG. 10 and step S305 in FIG. 19), the step of performing the enlargement display control of extracting the display target range including the acquired specified portion 30 and having the size according to the acquired enlargement ratio from the object image 40 and displaying the display target range in the display area 161*a* of the display unit 16 (in the above embodiment, step S105 in FIG. 10 to step S119 in FIG. 11. In the modification 1, steps S305 to S310 in FIG. 19), and the step of performing any of the plurality of enlargement display controls in which the display target ranges extracted from the object image 40 are different from each other according to the position of the acquired specified portion 30 and the acquired enlargement range (in the above embodiment, the enlargement display control in any one of steps S109 to S110 in FIG. 10, steps S111 to S113, steps S114 to S116, or steps S117 to S119 in FIG. 11. In the above modifications, the enlargement display control including steps S305 to S308 and S310, or the enlargement display control including steps S305, S306, and S309).

According to this configuration, since the range including the specified portion 30 is appropriately extracted from the object image 40 and enlarged and displayed according to the specified portion 30 and the enlargement ratio, the user can appropriately enlarge and display the desired portion of the object image 40 by a simple operation of specifying the specified portion 30 and instructing enlargement.

<Others>

Note that the description in the above embodiment is an example of the imaging device, and the object image display method according to the present disclosure, and is not limited thereto.

For example, the method of displaying the object image 40 of the above embodiment can also be applied to normal imaging without using the barrel 2.

Further, the description has been given using the example in which the object image 40 and the enlarged image thereof are displayed in a part of the display area 161*a* of the display screen 161, but the present disclosure is not limited thereto, and the entire display screen 161 may be used as the display area of the object image 40 and the enlarged image thereof.

Further, the imaging device 1 is not limited to a digital camera operated by the user holding the imaging device 1 in a hand, and may be any imaging device capable of displaying the object image on a display unit in a case of imaging the object.

In the above embodiment, the case in which the object image 40 is displayed on the display unit 16 of the imaging device 1 has been exemplified, but the present disclosure is not limited thereto. For example, the present disclosure may be applied to a case where a computer of the imaging device 1 controls display of the object image on a display unit provided outside the imaging device 1. Further, the present disclosure may be applied to a case where a computer of an arbitrary information processing device other than the imaging device 1 controls display of the object image on an arbitrary display unit. In these cases, for example, the object image may be displayed on a display unit provided with a touch panel and the user is prompted to specify the specified portion, and the computer may perform the enlargement display control and the reduction display control according to the operation of the user. Further, the object image to be displayed is not limited to a through-the-lens image (live view image) indicating the angle of view to be captured, and may be an object image recorded by an imaging operation. That is, the present disclosure may be applied to a case where the captured object image is reproduced and displayed.

Although the enlargement reference points P1 to P3 and P7 are exemplified as the enlargement reference portions, the enlargement reference portion is not limited to a point, and may be a part over a certain range of the edge portion of the object image. Further, although the reduction reference points P4 to P6 are exemplified as the reduction reference portions, the reduction reference portion is not limited to a point, and may be a part over a certain range of the edge portion of the object image. Further, the enlargement reference point and the reduction reference point may be set inside the object image excluding the edge portion.

Further, in the above embodiment, the description has been given using the example in which the enlargement reference portion is set at the edge portion of the object image 40 in the enlargement display control in the case where the display target range cannot be extracted from the object image 40 according to the acquired enlargement ratio and such that the representative point Pr of the specified portion 30 is located at the center of the display target range, but the present disclosure is not limited thereto. Alternatively, the enlargement reference portion may be set at the edge portion of the object image 40 in the enlargement display control in the case where the display target range cannot be extracted from the object image 40 according to the acquired enlargement ratio and such that the representative point Pr of the specified portion 30 is located in the middle (a predetermined range near the center point) of the display target range.

Further, in the case where the display target range can be extracted from the object image 40 such that the representative point Pr of the specified portion 30 is located in the middle of the display target range, the representative point Pr does not necessarily need to be located at the center point of the display target range and may be located in the middle in the extracted display target range.

Further, in the above description, the example where the storage unit 13 is used as a computer-readable medium of the program according to the present disclosure has been disclosed, but the present disclosure is not limited to this example. As another computer-readable medium, an information recording medium such as an HDD, an SSD, a flash memory, or a CD-ROM can be applied. Further, a carrier wave (carrier) is also applied to the present disclosure as a medium for providing data of the program according to the present disclosure via a communication line.

Further, it is a matter of course that the detailed configuration and detailed operation of the components of the imaging device 1 in the above embodiment can be appropriately changed without departing from the gist of the present disclosure.

Although the embodiments of the present disclosure have been described, the scope of the present disclosure is not limited to the above-described embodiments, and includes the scope of the invention described in the claims and the equivalent scope thereof.

What is claimed is:

1. A device comprising:
   at least one processor configured to control a display operation of a display unit,
   wherein the at least one processor:
      acquires a specified portion specified by a first user operation in an object image including an object to be imaged;
      sets a representative point representing a position of the specified portion in the object image;
      acquires an enlargement ratio of the object image, and performs enlargement display control of enlarging a part of the object image and displaying the enlarged part in a display area of the display unit, in response to a second user operation; and
      sets an enlargement reference point in the object image according to the specified portion, the enlargement reference point being a point with respect to which the part of the object image is enlarged in the enlargement display control,
   wherein the at least one processor extracts a display target range from the object image as the part of the object image to be enlarged in the enlargement display control, the display target range comprising the enlargement reference point and the specified portion, and
   wherein in performing the enlargement display control, the at least one processor sets the enlargement reference point to an edge portion of the object image so that the representative point approaches a middle of the display area in response to each input of the second user operation until the representative point coincides with the middle of the display area, in a case in which it is not possible to extract the display target range, and in a case in which a position of the representative point at a time of input of the second user operation does not already coincide with the middle of the display area.

2. The device according to claim 1, wherein the device comprises an imaging device.

3. The device according to claim 1, wherein the representative point corresponds to a position of the first user operation.

4. The device according to claim 3, wherein the specified portion is set as a predetermined area defined with respect to the representative point.

5. The device according to claim 1, wherein in the enlargement display control, in response to input of the second user operation in a case in which the position of the representative point coincides with the center of the display area, the part of the object image is enlarged with respect to the center of the display area as a reference.

6. The device according to claim 1, wherein the at least one processor further sets a focus position at a position of the representative point in the display area.

7. The device according to claim 1, wherein in performing the enlargement display control, the at least one processor sets the enlargement reference point to the edge portion of the object image in a case in which it is not possible to extract the display target range in such a way that (i) the display target range is contained within an outer boundary of the display area, (ii) the display target range includes both the enlargement reference point and the specified portion, and (iii) the representative point is positioned at a middle of the display target range.

* * * * *

UNITED STATES PATENT AND TRADEMARK OFFICE
CERTIFICATE OF CORRECTION

| | | |
|---|---|---|
| PATENT NO. | : 12,075,164 B2 | Page 1 of 1 |
| APPLICATION NO. | : 18/376126 | |
| DATED | : August 27, 2024 | |
| INVENTOR(S) | : Nobuhiro Aoki, Yuya Hayashi and Yuki Katada | |

It is certified that error appears in the above-identified patent and that said Letters Patent is hereby corrected as shown below:

On the Title Page

Item (54), delete "ENLARGMENT" and insert --ENLARGEMENT--.

In the Specification

Column 1, in the title and above "REFERENCE TO RELATED APPLICATION", delete "ENLARGMENT" and insert --ENLARGEMENT--.

Signed and Sealed this
Twentieth Day of May, 2025

Coke Morgan Stewart
*Acting Director of the United States Patent and Trademark Office*